US006909902B1

United States Patent
Sawada et al.

(10) Patent No.: US 6,909,902 B1
(45) Date of Patent: Jun. 21, 2005

(54) RADIO BASE STATION EQUIPMENT AND MOBILE STATION EQUIPMENT DETERMINING LOCATION OF MOBILE STATION BY ASSOCIATING WITH ANOTHER RADIO BASE STATION OR MOBILE STATION IN A MOBILE COMMUNICATION SYSTEM

(75) Inventors: Kensuke Sawada, Kawasaki (JP); Noriyuki Kawaguchi, Kawasaki (JP); Satoshi Nakamura, Kawasaki (JP); Tokuro Kubo, Kawasaki (JP); Dai Kimura, Kawasaki (JP); Morihiko Minowa, Kawasaki (JP); Kazuo Nagatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 997 days.

(21) Appl. No.: 09/583,524

(22) Filed: May 31, 2000

(30) Foreign Application Priority Data

May 31, 1999 (JP) .......................................... 11-152303

(51) Int. Cl.$^7$ ................................................. H04Q 7/20
(52) U.S. Cl. ............................... 455/456.1; 455/404.1; 342/457
(58) Field of Search .......................... 455/456.1, 456.2, 455/456.3, 456.4, 456.5, 456.6, 457, 561, 562.1, 404.1, 404.2, 405; 342/450, 457, 357.1

(56) References Cited

U.S. PATENT DOCUMENTS

| 5,809,424 A | * | 9/1998 | Eizenhoefer ............. 455/456.2 |
| 6,026,304 A | * | 2/2000 | Hilsenrath et al. ....... 455/456.2 |
| 6,101,391 A | * | 8/2000 | Ishizuka et al. ............ 455/457 |
| 6,249,252 B1 | * | 6/2001 | Dupray ....................... 342/450 |

FOREIGN PATENT DOCUMENTS

| JP | 64-65472 | 3/1989 |
| JP | 05232210 | 9/1993 |
| JP | 07255079 | 10/1995 |
| JP | 09046292 | 2/1997 |

* cited by examiner

Primary Examiner—Tilahun Gesesse
(74) Attorney, Agent, or Firm—Katten Munchin Zavis Rosenman

(57) ABSTRACT

This invention relates to a radio base station equipment and a mobile station equipment in a mobile communication system that operate as determination stations adapted for a predetermined navigation or associate with other radio base station(s) or mobile station(s) to radio-determine the location of a desired mobile station. The mobile communication system achieves a radio determination economically and reliably while flexibly adapting itself to the substantial traffic distribution and transmission characteristics in individual wireless zones as well as the zone configuration, channel allocation, the procedure of channel control, and the structure of hardware.

91 Claims, 10 Drawing Sheets

FIG. 10

| COMBINATION OF DETERMINATION STATION AND EFFECTIVE DETERMINATION RESPONSE | | | | | | NUMBER OF EFFECTIVE ARRIVAL ANGLES Nθ | NUMBER OF EFFECTIVE RELATIVE DISTANCES Nr | APPLICABLE NAVIGATION | | | | GEOGRAPHICAL INFORMATION |
|---|---|---|---|---|---|---|---|---|---|---|---|---|
| MS 90-1 | | MS 90-2 | | MS 90-3 | ... | | | 3r NAVIGATION | THETA-THETA NAVIGATION | 2r-THETA NAVIGATION | r-THETA NAVIGATION | |
| ARRIVAL ANGLE Θ₁ | RELATIVE DISTANCE d₁ | ARRIVAL ANGLE Θ₂ | RELATIVE DISTANCE d₂ | ARRIVAL ANGLE Θ₃ | RELATIVE DISTANCE d₃ | | | | | | | |
| (1) — | ○ | — | ○ | — | ○ | — | 3 | ○ | | | | |
| (2) ○ | — | ○ | — | — | — | 2 | — | | ○ | | | |
| ○ | — | — | — | ○ | — | 2 | — | | ○ | | | |
| — | — | ○ | — | ○ | — | 2 | — | | ○ | | | |
| (3) △ | ○ | △ | ○ | △ | — | pl. | 2 | | | ○ | | |
| △ | ○ | △ | — | △ | ○ | pl. | 2 | | | ○ | | |
| △ | — | △ | ○ | △ | ○ | pl. | 2 | | | ○ | | |
| (4) ○ | △ | — | △ | — | △ | 1 | 1 | | | | ○ | |
| — | △ | ○ | △ | — | △ | 1 | 1 | | | | ○ | |
| — | △ | — | △ | ○ | △ | 1 | 1 | | | | ○ | |

COMBINATION CAPABLE OF ELIMINATING UNCERTAINTIES ACCORDING TO GEOGRAPHICAL INFORMATION 118A-1～118A-n
118B-1～118B-n

NOTE
○ : VALID (APPLICABLE)
— : DOESN'T MATTER
△ : ONLY ONE FROM THOSE MARKED "△" IS VALID

RADIO BASE STATION EQUIPMENT AND MOBILE STATION EQUIPMENT DETERMINING LOCATION OF MOBILE STATION BY ASSOCIATING WITH ANOTHER RADIO BASE STATION OR MOBILE STATION IN A MOBILE COMMUNICATION SYSTEM

BACKGROUND OF THE INVENTION

1. Field of the Invention

The present invention relates to radio base station equipment and mobile station equipment for determining the locations of mobile stations in a mobile communication system.

2. Description of the Related Art

In recent years, because of liberalization of the market and competition among communication service providers, telephone charges and the prices of terminal equipments have been lowered. Furthermore, portable terminal equipments having various functions adapted for users' needs have been put into practical use. Consequently, the use of mobile communication systems has become rapidly widespread.

According to the aforementioned competition and the development of techniques adapted for multimedia communications, mobile communication systems are required to have higher added values. For example, it is strongly required that determination services be offered to a terminal equipment possessed by a person who encounters an emergent situation, to determine the position of the terminal equipment economically and accurately.

A known technique (hereinafter referred to as the first prior art technique) for accomplishing such determination using PHS is to cause a radio base station to discern terminals located in a wireless zone formed by the local station, by determining the position of a desired terminal by a wireless zone. In PHS, each wireless zone is generally formed as a microcell having a radius of one hundred meter to hundreds of meters.

Another known technique (hereinafter referred to as the second prior art technique) is available that can be applied to portable and in-vehicle terminal equipments. For example, such a terminal equipment is equipped with a receiver for receiving signals arriving simultaneously from four or three or more GPS (global positioning system) satellites. Radio determination is accomplished by obtaining root(s) of 4 or 3 determination equations using different information contents contained in the signals above. The information contents are three-dimensional locations of the individual GPS satellites and the relative distances to these satellites, that are obtained according to the information.

With the aforementioned first prior art technique, the wireless zone(s) that is/are the current location of a terminal which is the object of determination (hereinafter referred to as the determination target station) and is/are not always singular, depending on the zone configuration or on the establishment form of radio base stations.

Where the determination target station is located in a area where plural radio base stations are formed closely, it may be impossible to find that the determination target station is located in the wireless zone formed by the closest radio base station, due to overreach or multipath or for other cause. Hence, there is the possibility that the accuracy of determination deteriorates uselessly.

Furthermore, the radius of a wireless zone is set to a value adapted for the traffic distribution during the busy hour. Therefore, the radius is set to smaller values in urban areas. Conversely, the radius is set to larger values with increasing distance from urban areas.

Accordingly, the first prior art technique provides determination accuracy that is not always sufficiently high. In addition, determination target stations located in areas where there are no radio base stations cannot become a subject of determination.

With respect to the second prior art technique, in determination target stations located in urban areas, reception of signals transmitted by GPS satellite is hindered by tall buildings and other objects. Otherwise, the signals are received through multipath. Consequently, stable determination is not accomplished. Even when the determination is realized, the accuracy is not always sufficiently high.

SUMMARY OF THE INVENTION

It is an object of the present invention to provide radio base station equipment and mobile station equipment for achieving determination of a desired mobile station economically and accurately by making effective use of the hardware forming a mobile communication system.

It is another object of the invention to provide a mobile communication system in which the present invention is applied and achieves a desired determination of a mobile station economically and accurately, even when the transmission characteristics of radio channels used for communication services vary or fluctuate, by making effective use of these radio channels and operating the desired mobile station as a determination station.

It is a further object of the invention to achieve radio determination of a determination target station mainly under control of radio base station equipment by operating a mobile station as a determination station forming a basis for the determination of the determination target station.

It is yet another object of the invention to radio-determine the location of a determination target station mainly under control of radio base station equipment with less load on the radio base station equipment, even when the determination target station is equipped with sections for determining the location of the determination target station by itself by some navigation.

It is still another object of the invention to provide a technique permitting a determination target station to radio-determine the location of the local station by itself, even when a determination station is equipped with no sections for determining the location of the determination station itself.

It is an additional object of the invention to provide a technique for enhancing the accuracy of determining a determination target station.

It is a yet further object of the invention to provide a technique for accurately satisfying selection criteria for a navigation to be used for computation of the location of a determination station, even when the location of the determination station varies or the result of the determination of the determination target station according to this determination station varies.

It is a yet additional object of the invention to provide a technique for achieving determination of a determination target station, even when any of determination stations do not operate normally or when results of determination of the determination target station fail to contain information about distances or azimuth angles due to fluctuations and other causes of the transmission characteristics of a radio transmission path used for the radio determination.

It is a still additional object of the invention to provide a technique for achieving determination of a desired determination target station by flexibly adapting itself to the traffic, the distribution of calls, and other states in a wireless zone formed by the local station.

It is a further object of the invention to provide a technique for continuing determination of a desired determination target station stably while flexibly adapting itself to movement and the state of operation of a determination station.

It is a further object of the invention to provide a technique for achieving radio determination of a determination target station while flexibly adapting itself to the form of the association of a determination station with a determination target station.

It is a further object of the invention to provide a technique for enhancing the accuracy of determination of a determination target station.

It is a further object of the invention to provide a technique for assisting radio determination of a determination target station by relaying information associated with the radio determination of the determination target station and a determination station without the need to operate the station as the determination target station or as the determination station.

It is a further object of the invention to provide a technique for accurately achieving radio determination of a determination target station even when a desired number of mobile stations to be operated as determination stations cannot be secured.

It is a further object of the invention to provide a technique for distributing the load on radio base stations even when there are many determination target stations to be radio-determined simultaneously.

It is a further object of the invention to provide a technique for distributing the load needed for achieving determination of a determination target station over determination stations.

It is a further object of the invention to provide a technique for accurately achieving determination of a determination target station while suppressing the size of the hardware of mobile stations capable of being operated as determination stations.

It is a further object of the invention to provide a technique for enhancing the accuracy of determination of a determination target station.

It is a further object of the invention to provide a technique for accurately computing the location of a determination target station even when any one of determination stations does not operate normally or when results of determination of the determination target station fail to contain information about distances or azimuth angles due to fluctuations and other causes of the transmission characteristics of a radio transmission path used for the radio determination.

It is a further object of the invention to provide a technique for achieving determination of a desired determination target station by flexibly adapting itself to the traffic, the distribution of calls, and other states in a wireless zone formed by the local station.

It is a further object of the invention to provide a technique for continuing determination of a desired determination target station stably while flexibly adapting itself to movement and the state of operation of determination stations.

It is a further object of the invention to provide a technique for accurately achieving radio determination of a determination target station under association of determination stations with a determination target station while flexibly coping with the form of the association.

It is a further object of the invention to provide a technique for not only permitting radio determination of the determination target station to be carried out instead of a radio base station for flexibly copying with the state of the operation of a system as a basis for a determination target station or as a basis for radio determination of the determination target station.

It is a further object of the invention to provide a technique for stably performing determination of a local station even when the local station is moved or the transmission characteristics of the radio transmission path fluctuate.

The objects described above are achieved by radio base station equipment for voluntarily finding the location of a determination target station by applying a predetermined navigation to positional information about a determination station, the information being obtained by association of a mobile station operating as the determination station with the determination target station.

In this radio base station equipment, radio determination of a determination target station is achieved under control of the radio base station equipment by operating a singular or plural P of mobile station(s) that can receive communication services under channel control provided by the radio base station equipment as determination station(s) and by being a basis for determination of the determination target station.

The above-described objects are achieved by a radio base station equipment characterized in that a location found by a determination station regarding either this determination station or a determination target station is obtained according to the procedure of channel control.

In this radio base station equipment, processing that would normally be necessary for computation of the locations of determination stations is unnecessary, or the amount of the processing is reduced. Therefore, the load is decreased. Furthermore, when these determination stations are equipped with sections for determining the locations of the determination stations themselves by any navigation, radio determination of the determination target station is accomplished under control of the radio base station equipment.

The above-described objects are also achieved by radio base station equipment characterized in that it is equipped with separate sections for performing radio determinations of determination stations.

In this radio base station equipment, the locations of the determination stations, respectively, are obtained under control of the radio base station equipment. Therefore, even in case that there are no means for performing determination of these determination stations, radio determination of the determination target station is performed.

The above-described objects are also achieved by radio base station equipment characterized in that it refrains from using the results of radio determination of determination stations when the quality of the radio transmission path used for the radio determination of the determination stations is not good.

In this radio base station equipment, radio determination of individual determination stations is performed through radio transmission paths having good transmission quality and so the accuracy of the determination of the determination target stations is enhanced.

The above-described objects are also achieved by radio base station equipment characterized in that it uses a navigation adapted for the results of radio determination operations performed on determination stations and a determination target station, as well as condition recognized in the process of channel control.

In this radio base station equipment, the location of a determination target station is computed according to a navigation adapted to predetermined selection criteria and to the combinations of the locations of determination stations and the ingested results of determination. Therefore, these selection criteria are satisfied accurately even when the location of any determination station varies or when the results of the determination vary.

The above-described objects are also achieved by radio base station equipment characterized in that the range of usable navigation can be extended to navigation capable of eliminating uncertainties from determination of a determination target station, according to either zone configuration or on geographical limitations associated with the zone configuration or according to limitation of some sort associated with maintenance and operation.

In this radio base station equipment, the location of the determination target station can be determined accurately even when any one of the determination stations does not operate normally or when results of determination of the determination target station fail to contain information about distances or azimuth angles due to variations of the transmission characteristics of a radio transmission path used for the radio determination.

The above-described objects are also achieved by radio base station equipment characterized in that mobile stations that should become determination stations are appropriately selected according to the procedure of channel control.

In this radio base station equipment, mobile stations that should become determination stations are selected according to the procedure of channel control. Therefore, determination of a desired determination target station is accomplished while flexibly coping with the distribution of traffic and calls in a wireless zone formed by the local station.

The above-described objects are also achieved by radio base station equipment characterized in that, when a mobile station already operated as a determination station becomes a state in which the station is inappropriate as a determination station, an replacement mobile station is selected as a determination station according to the procedure of channel control.

In this radio base station equipment, some of mobile stations operated as determination stations may not be permitted to continue operating as determination stations according to movement, the state of the operation, or other variations of the mobile stations. When this situation is detected during the process of the aforementioned channel control, mobile stations other than the above-described mobile stations can be operated as determination stations instead.

Accordingly, determination of a desired determination target station can be continued stably while flexibly coping with moves made on the determination stations and the state of operation.

The above-described objects are also achieved by radio base station equipment for assisting radio determination of a determination target station through determination stations by radio-determining the locations of mobile stations that should become the determination stations or operating as the determination stations.

In this radio base station equipment, the location of a determination station can be radio-determined by itself. The results can be sent to the aforementioned determination stations and to the determination target station. Therefore, it is possible to assist the radio determination of the determination target station carried out under association of the determination stations with the determination target station while flexibly coping with the form of the association of the determination stations with the determination target station.

The above-described objects are also achieved by radio base station equipment characterized in that it refrains from using the results of radio determination obtained under a state that the transmission quality of radio transmission paths used for radio determination of determination stations is not good.

In this radio base station equipment, the locations of the determination stations are obtained with high accuracy and so the accuracy of the determination of the determination target station can be enhanced.

The above-described objects are also achieved by radio base station equipment that assists radio determinations of determination target stations by relaying information to be passed, to realize the radio determination of the determination target station, between any determination station and determination target station or between plural determination stations.

In this radio base station equipment, it is possible to assist the aforementioned radio determination by relaying information about the radio determination, even when the equipment does not act as a determination target station or as a determination station.

The above-described objects are also achieved by radio base station equipment characterized in that it can operate also as a determination station.

In this radio base station equipment, the location of a determination target station relative to the local station is appropriately measured according to the procedure of channel control provided by the local station, or an assisting operation associated with the measurement of the relative location is performed. Therefore, even in case that a desired number of mobile stations to be operated as determination stations cannot be secured, radio determination of a determination target station can be accomplished with high accuracy.

The above-described objects are also achieved by mobile station equipment capable of replacing the aforementioned radio base station equipment.

In this radio base station equipment, radio determination of a determination target station is carried out by being in association with one or both of a mobile station operating as a determination station and the aforementioned radio base station equipment.

Accordingly, even in case that there are numerous determination target stations which should be simultaneously radio-determined, the load on the radio base station is distributed.

The above-described objects are also achieved by mobile station equipment which has means for radio-determining the location of the determination target station and which is capable of assisting determination of a determination target station by notifying the results of the radio determination to all or some of determination stations and the determination target station.

In this mobile station equipment, the location of the determination target station is radio-determined by itself, and the determination stations and the determination target station are informed of the results. Therefore, it is possible to assist the radio determination of the determination target station carried out under association of the determination stations with the determination target station while flexibly coping with the form of the association of the determination stations with the determination target station.

The above-described objects are also achieved by mobile station equipment characterized in that it refrains from using results, of the results of radio determination of determination stations, obtained when the quality of the radio transmission path used for the radio determination of the determination stations is not good.

In this mobile station equipment, radio determination of a determination target station is accomplished with high accuracy and so the accuracy of radio determination of the determination target station is enhanced.

The above-described objects are also achieved by mobile station equipment which has means for radio-determining the location of the determination target station and which is capable of assisting determination of the determination target station by notifying the results of the radio determination to all or some of determination stations and the determination target station.

This mobile station equipment radio-determines the locations of determination stations by itself and notifies the results to the aforementioned determination stations and determination target stations. Therefore, it is possible to assist radio determination of the determination target station carried out under association of the determination stations with the determination target station while flexibly coping with the form of the association of the determination stations with the determination target station.

The above-described objects are also achieved by mobile station equipment characterized in that it refrains from using results, of the results of radio determination of determination stations, obtained when the quality of the radio transmission path used for the radio determination of the determination stations is not good.

In this mobile station equipment, the location of the determination station is obtained with high accuracy and so the accuracy of determination of the determination target station is enhanced.

The above-described objects are also achieved by a mobile station equipment characterized in that it can be operated as a determination station or as a determination target station.

In this mobile station equipment, the determination of a determination target station can be carried out instead of by a radio base station. In addition, the equipment can flexibly cope with the state of operation of a system as a basis for this determination target station or for radio determination of the determination target station.

The above-described objects are also achieved by mobile station equipment characterized in that, when the local station operates as a determination target station and it is impossible to maintain the seizure of a radio channel between the local station and a radio base station, the equipment requires the radio base station to eliminate this state directly or indirectly, i.e., through any determination station.

This mobile station equipment can continue to be an object of stable determination for the other mobile stations that are determination stations.

Other objects and features of the invention will appear in the course of the detailed description according to drawings attached hereto.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 10 is a diagram illustrating the structure of a navigation selection table.

DESCRIPTION OF THE PREFERRED EMBODIMENTS

Figure 1:
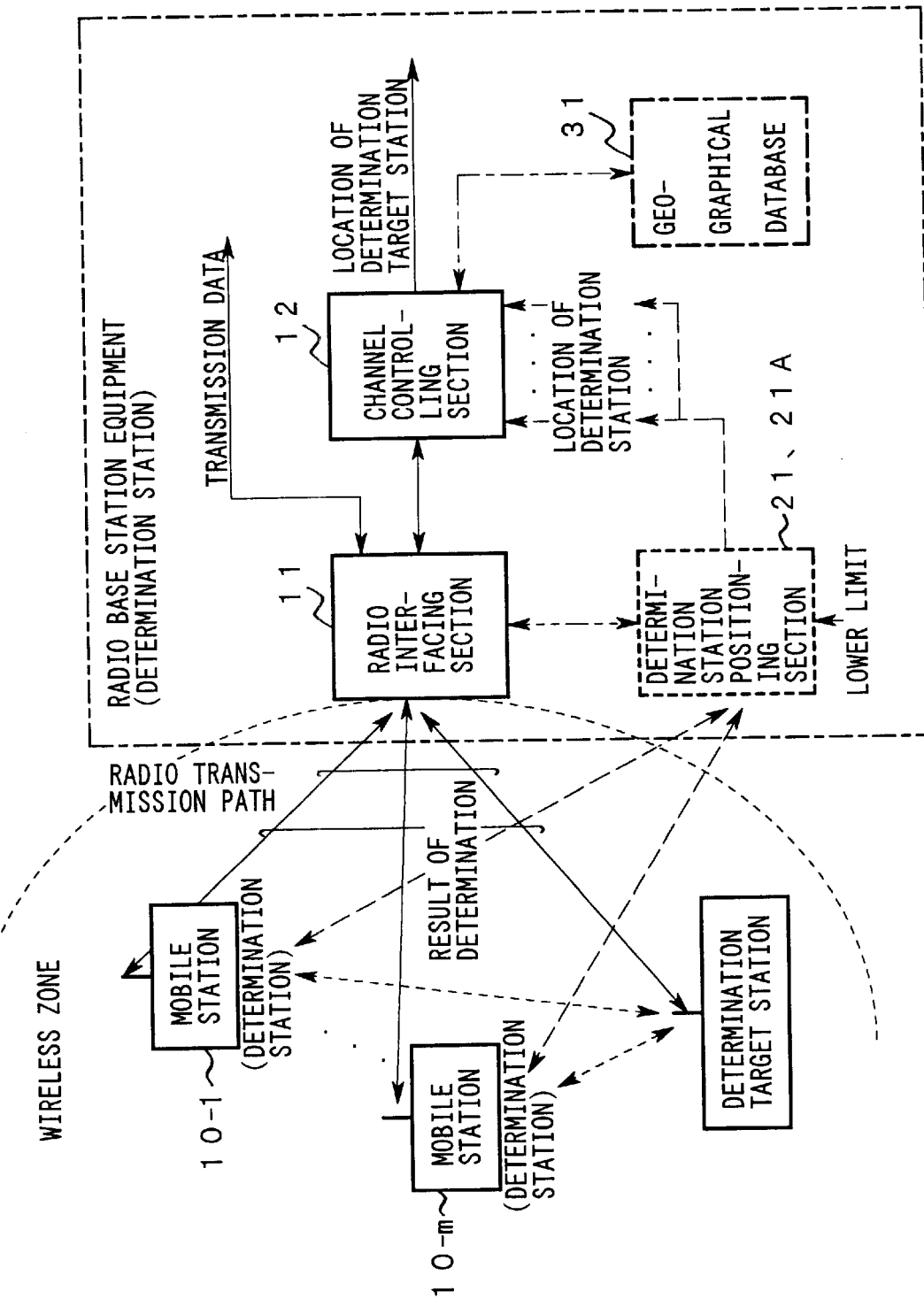
FIG. 1 is a block diagram illustrating the principle of radio base station equipment according to the present invention.

The principle of the present invention is first described by referring to FIG. 1, which is a block diagram of radio base station equipment in accordance with the invention to depict the principle of the radio base station.

The principle of first radio base station equipment in accordance with the present invention is as follows.

A radio interfacing section 11 forms a wireless zone in which mobile stations 10-1 to 10-$m$ are located. The radio interfacing section 11 forms a radio transmission path between this radio interfacing section 11 and the mobile stations 10-1 to 10-$m$. The radio interfacing section 11 transmits and receives information through the radio transmission path. A channel controlling section 12 is located opposite to the mobile stations 10-1 to 10-$m$ with the radio interfacing section 11 therebetween, and provides channel control adapted for the wireless zone. Positions are imparted to one or more (P) determination stations of these mobile stations 10-1 to 10-$m$ under channel control, and these determination stations form a basis for determination of a determination target station. The one or more (P) determination stations associate with the determination target station, thus performing a radio determination operation. As a result, angles of arrival and relative distances are obtained. A channel controlling section 12 ingests results of the determination that are all or some of the arrival angles and relative distances through the radio interfacing section 11. A predetermined navigational method is applied to these positions and results of determination and thus the channel controlling section computes the position of the determination target station.

In the radio base station equipment of the configuration described above, one or more (P) mobile stations can receive communication services under the aforementioned channel control, operate as determination stations, and realize a basis for determination of the determination target station. In this way, radio determination of the determination target station can be accomplished voluntarily.

The principle of second radio base station equipment in accordance with the present invention is as follows.

A channel controlling section 12 obtains the positions according to the procedure of channel control, the positions having been found by one or more (P) determination stations separately according to a predetermined navigation.

In the radio base station equipment of this structure, the locations of the one or more (P) determination stations are found by these determination stations, respectively, using a predetermined navigation. The channel controlling section 12 obtains these locations according to the procedure of channel control. Also, these locations are used in computing the location of the determination target station.

That is, processing which would be normally necessary for computations of the locations of the determination stations is made unnecessary. Otherwise, the amount of processing performed by the channel controlling section 12 is reduced.

Accordingly, the load is reduced and even in case that the aforementioned determination stations are equipped with section for determining the position of the local station by some navigation, radio determination of the determination target station is carried out mainly under control of the radio base station equipment.

The principle of third radio base station equipment in accordance with the present invention is as follows.

A determination station positioning section 21 radio-determines the positions of one or more (P) determination stations. A channel controlling section 12 employs results of determination of one or more (P) determination stations performed by the determination station positioning section 21, together with the results of the determination.

In the radio base station equipment of the structure described above, the locations of individual determination stations are found mainly under control of the radio base station equipment and, therefore, even in case that any section for determining the locations of these determination stations is not fitted, radio determination of the determination target station is carried out voluntarily.

The principle of fourth radio base station equipment in accordance with the present invention is as follows.

A determination station positioning section 21 monitors the transmission quality of a radio transmission path used for radio determination. When the transmission quality is lower than a predetermined lower limit, the determination section 21 discards the results of radio determination obtained through this radio transmission path.

In the radio base station equipment of the structure described above, radio determination of each individual determination station is carried out through a radio transmission path having good transmission path. In consequence, the accuracy of the determination of the determination target station is enhanced.

The principle of fifth radio base station equipment in accordance with the present invention is as follows.

A channel controlling section 12 selects a navigation from plural navigation available such that the selected navigation is adapted for the combination of obtained position and ingested results of determination regarding one or more (P) determination stations. The selected navigation also satisfies predetermined selection criteria.

In the radio base station equipment of the structure described above, the location of the determination target station is computed, according to the navigation adapted for the combination of obtained location and ingested results of determination regarding one or more (P) determination stations and also for the predetermined selection criteria. Therefore, even in case that the position of any determination station or results of the determination vary, the selection criteria are satisfied with high accuracy.

The principle of sixth radio base station equipment in accordance with the present invention is as follows.

In some areas, determination target stations to be radio-determined using one or more (P) determination stations as references are located. In other areas, these determination target stations cannot be located. In some navigation, uncertainties of the position of the determination target station can be eliminated where data about such areas are also used. Combinations of the aforementioned one or more (P) determination stations, the above-described areas, and an identifier of the navigation described above have been previously registered in a geographical database 31. The channel controlling section 12 uses the areas and navigation stored in the geographical database 31 so as to correspond to the obtained locations and ingested results of determinations about the one or more (P) determination stations.

In the radio base station equipment of the structure described above, when any one of the determination stations fails to operate normally, or when results of radio determination of the determination target station fail to contain some distances or azimuth angles due to variations of the transmission characteristics of a radio transmission path used for the radio determination or for other cause, the determination of the determination target station can be carried out with high accuracy.

The principle of seventh radio base station equipment in accordance with the present invention is as follows.

A channel controlling section 12 selects one or more (P) mobile stations satisfying predetermined criteria according to the procedure of channel control from mobile stations 10-1 to 10-m, and performs channel control necessary to operate the selected mobile stations as determination stations.

In the radio base station equipment of the structure described above, mobile stations to be treated as determination stations are selected according to the procedure of channel control and so determination of a desired determination target station is accomplished while flexibly coping with the distribution of traffic and calls in a wireless zone formed by the local station and other situations.

The principle of eighth radio base station equipment in accordance with the present invention is as follows.

A channel controlling section 12 makes a decision as to whether one or more (P) mobile stations selected as determination stations satisfy predetermined criteria, according to the procedure of channel control. When any mobile station is found to be false as a result of the decision, a mobile station capable of replacing that mobile station is selected. Also, the channel controlling section performs channel control required to operate this mobile station as a determination station.

In the radio base station equipment of this structure, the channel controlling section 12 makes a decision as to whether one or more (P) mobile stations selected as determination stations satisfy predetermined criteria, according to the procedure of channel control. When any mobile station is found to be false as a result of the decision, the channel controlling section 12 selects a mobile station capable of replacing that mobile station. Also, the channel controlling section performs channel control required to operate the mobile station as a determination station.

That is, some mobile stations are operated as determination stations. During the process of the aforementioned channel control, it is found that some of these mobile stations are not permitted to keep operating as determination stations according to the movement of the mobile stations, the state of operation, and other variations. Mobile stations other than these mobile stations can be operated as determination stations instead.

Therefore, determination of a desired determination target station is stably continued while flexibly coping with movement of determination stations and the state of operation.

The principle of ninth radio base station equipment in accordance with the present invention is as follows.

A radio interfacing section 11 forms a wireless zone in which mobile stations 10-1 to 10-$m$ are located. The radio interfacing section 11 forms a radio transmission path between this radio interfacing section 11 and the mobile stations 10-1 to 10-$m$. The radio interfacing section 11 transmits and receives information through the radio transmission path. A channel controlling section 12 is located opposite to the mobile stations 10-1 to 10-$m$ through the radio interfacing section, and performs channel control suitable for the wireless zone. Of the mobile stations 10-1 to 10-$m$, one or more (P) determination stations form a basis for radio determination of a determination target station. A determination station positioning section 21A radio-determines the locations of the aforementioned one or more (P) determination stations. The channel controlling section 12 notifies all or some of the one or more (P) determination stations through the radio interfacing section 11 of locations of these determination stations, respectively, which have been radio-determined by the determination station positioning section 21A.

The radio base station equipment of the structure described above radio-determines the locations of determination stations by itself and notifies the results to the determination stations and determination target station. Consequently, it is possible to assist the radio determination of the determination target station conducted under association of the determination stations with the determination target station while flexibly coping with the form of the association of the determination stations with the determination target.

The principle of tenth radio base station equipment in accordance with the present invention is as follows.

A determination station positioning section 21A performs a radio determination operation through a radio channel having assured desired transmission quality under channel control performed by a channel controlling section 12. The determination section 21A discards results of a used radio channel having transmission quality lower than a predetermined lower limit, the results being contained in results of the radio determination described above.

In the radio base station equipment of the structure described above, the determination station position determination section 21A performs a radio determination through a radio channel having assured desired transmission quality under channel control performed by the channel controlling section 12. The determination section 21A discards results of a used radio channel having transmission quality lower than a predetermined lower limit, the results being contained in results of the radio determination described above.

That is, the radio base station equipment in accordance with the present invention finds the positions of determination stations with high accuracy. Also, the accuracy of determination of a determination target station is enhanced.

The principle of eleventh radio base station equipment in accordance with the present invention is as follows.

A radio interfacing section 11 forms a wireless zone in which mobile stations 10-1 to 10-$m$ are located. The radio interfacing section 11 forms a radio transmission path between this radio interfacing section 11 and the mobile stations 10-1 to 10-$m$. The radio interfacing section 11 transmits and receives information through the radio transmission path. A channel controlling section 12 is located opposite to the mobile stations 10-1 to 10-$m$ through the radio interfacing section 11, and performs channel control adapted for the wireless zone. Furthermore, the channel controlling section 12 passes information concerning the radio determination through the radio interfacing section 11 among a determination target station undergoing radio determination and one or more (P) determination stations contained in the mobile stations 10-1 to 10-$m$ and forming a basis for the radio determination or among these determination stations, or passes the information to one of the stations.

The radio base station equipment of the structure described above is able to assist the radio determination described above by relaying the information concerning the radio determination even when the stations are not operated as determination target stations or determination stations.

In twelfth radio base station equipment in accordance with the present invention, a radio interfacing section 11 and a channel controlling section 12 operate as determination stations according to the procedure of channel control.

The radio base station equipment of the structure described above appropriately measures the position of the determination target station relative to the local station, according to the procedure of channel control performed by the local station, or assists the measurement of the relative location.

Accordingly, even in case that it is impossible to secure a desired number of mobile stations to be operated as determination stations, radio determination of the determination target station is accomplished with high accuracy.

Figure 2:
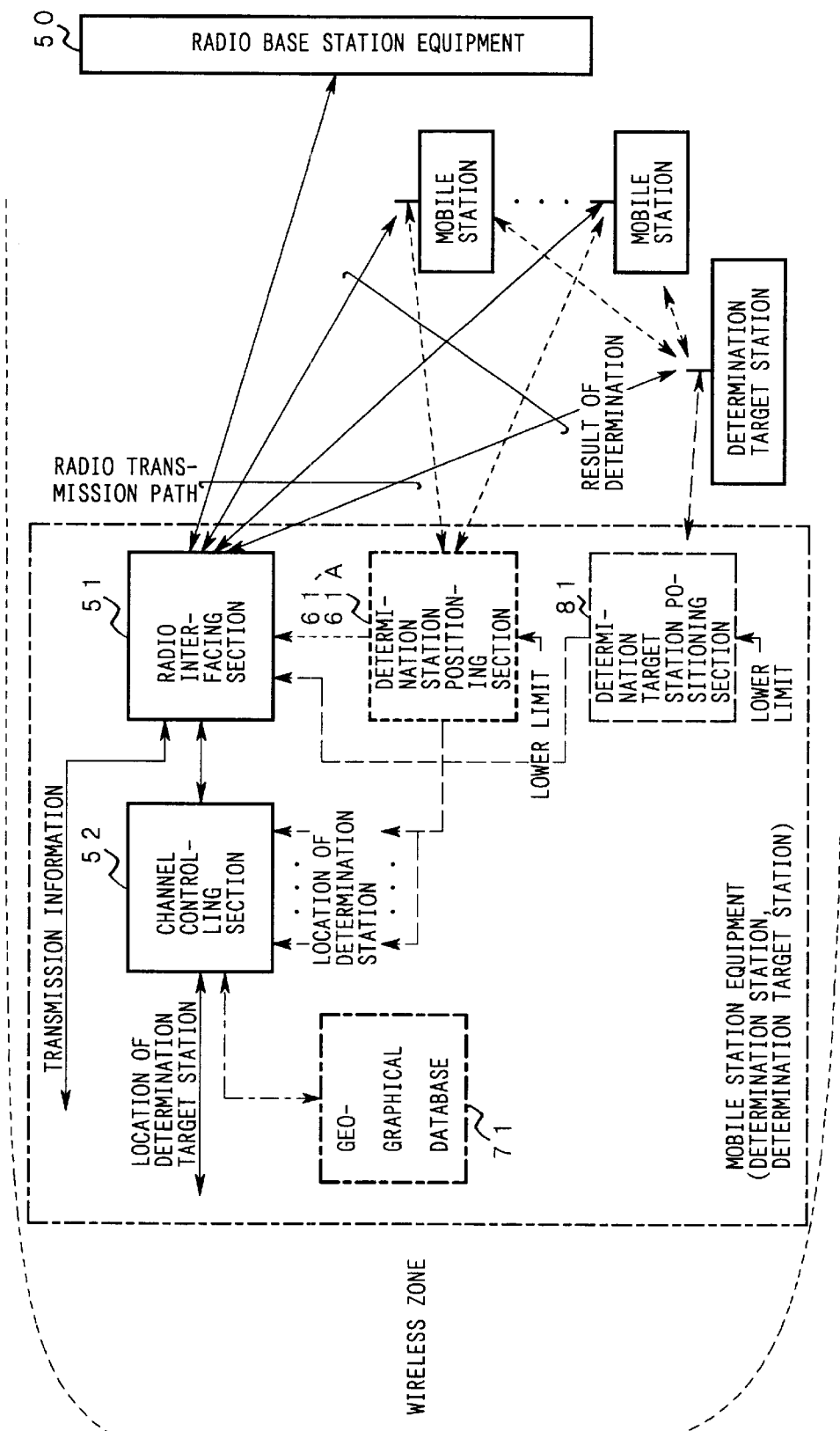
FIG. 2 is a block diagram illustrating the principle of mobile station equipment according to the present invention.

FIG. 2 is a block diagram illustrating the principle of mobile station equipment in accordance with the present invention.

The principle of first mobile station equipment in accordance with the present invention is as follows.

A radio interfacing section 51 forms a radio transmission path between this radio interfacing section 51 and a radio base station 50, and transmits and receives information through the radio transmission path. A channel controlling section 52 associates with the radio base station 50 through the radio interfacing section 51, and performs channel control adapted for the wireless zone. One or more (P) determination stations and the local station are located in a common wireless zone. Positions are imparted to the one or more (P) determination stations under channel control, and the one or more (P) determination stations form a basis for determination of the determination target station. The one or more (P) determination stations associate with the determination target station, thus performing their respective radio determination operations. As a result, arrival angles and relative locations are obtained. A channel controlling section 52 ingests all or some of the results of these radio determination operations through the radio interfacing section 51, applies a predetermined navigation to these positions and determination results, and computes the location of the determination target station.

The mobile station equipment of the structure described above performs radio determination of the determination target station by associating with mobile stations operated as determination stations instead of radio base station.

Accordingly, even in case that there are many determination target stations to be measured by radio determination as described above at the same time, the load on the radio base station is distributed.

The principle of second mobile station equipment in accordance with the present invention is as follows.

A channel controlling section 52 obtains the position of the local station according to the procedure of channel control, it being noted that the positions of the local stations have been found by one or more (P) determination stations, respectively, according to a predetermined navigation.

The mobile station equipment of the structure described above can obtain the position of the determination target station without performing a radio determination at all. Therefore, the load on the determination station that is placed to conduct determination of the location of the determination target station actively is distributed.

In third mobile station equipment in accordance with the present invention, a determination station positioning section 61 radio-determines the location or locations of one or more (P) determination stations. A channel controlling section 52 uses the locations of the one or more (P) determination stations found by radio determination by section of the determination station positioning section 61, together with the results of determination.

With the mobile station equipment of the structure described above, the locations of the one or more (P) determination stations can be found accurately even in case that mobile station equipment operating as these determination stations is not provided with sections for finding the location of the local station by itself and notifying the mobile station equipment in accordance with the invention of the found position.

Therefore, the size of the hardware of mobile stations capable of operating as determination stations can be suppressed. Furthermore, the determination of the determination target station can be realized with high accuracy.

The principle of fourth mobile station equipment in accordance with the present invention is as follows.

A determination station positioning section 61 monitors the transmission quality of a radio transmission path used for radio determination. When the transmission quality is lower than a predetermined lower limit, the determination section 61 discards the results of radio determination obtained through this radio transmission path.

In the mobile station equipment of the structure described above, radio determination of each individual determination station is carried out through a radio transmission path having assured good transmission quality. In consequence, the accuracy of the determination of the determination target station is enhanced.

The principle of fifth mobile station equipment in accordance with the present invention is as follows.

A channel controlling section 52 selects one out of plural navigation available and uses the selected navigation that is adapted for the combination of obtained position and ingested results of determination regarding one or more (P) determination stations, for computation of the location of the determination target station. The navigation also satisfies predetermined selection criteria.

In the mobile station equipment of the structure described above, the location of the determination target station is computed, according to the navigation adapted for the combination of obtained position and ingested results of determination regarding one or more (P) determination stations and also for the predetermined selection criteria. Therefore, even when the location of any determination station or results of the determination vary, the selection criteria are satisfied with high accuracy.

The principle of sixth mobile station equipment in accordance with the present invention is as follows.

In some areas, determination target stations to be measured by radio determination using one or more (P) determination stations as references are located. In other areas, these determination target stations cannot be located. In some navigation, uncertainties of the position of the determination target station can be eliminated in case that data about such areas are also used. Combinations of the aforementioned one or more (P) determination stations, the above-described areas, and an identifier of the navigation described above have been previously registered in a geographical database 71. The channel controlling section 52 uses the areas and navigation stored in the geographical database 71 so as to correspond to the obtained locations and ingested results of determinations about the one or more (P) determination stations.

In the mobile station equipment of the structure described above, even in case that any one of the one or more (P) determination stations fails to operate normally, or even in case that results of radio determination of the determination target station fail to contain some distances or azimuth angles due to variations of the transmission characteristics of a radio transmission path used for the radio determination or for other cause, the determination of the determination target station can be computed with high accuracy.

In seventh mobile station equipment in accordance with the present invention, a channel controlling section 52 associates with a radio base station 50 through a radio interfacing section 51. Other mobile stations are located in the same wireless zone as the local stations. The channel controlling section 52 selects one or more (P) mobile stations satisfying predetermined criteria according to the procedure of channel control out of the above-described other mobile stations, and performs channel control necessary for the selected mobile stations to operate as determination stations.

In the operation of the mobile station equipment of the structure described above, mobile stations that should become determination stations are selected according to the procedure of channel control and so determination of the location of a desired determination target station is accomplished while flexibly coping with the distribution of traffic or calls or other circumstance in a wireless zone where the local station is located, as long as the aforementioned criteria are defined as events and information that can be discerned during the process of the channel control.

The principle of eighth mobile station equipment in accordance with the present invention is as follows.

When mobile stations replacing some of one or more (P) mobile stations operating as determination stations are selected by a radio base station 50, a channel controlling section 52 associates with the radio base station 50 through a radio interfacing section 51, thereby performing channel control necessary for the mobile stations to operate as determination stations.

In the operation of the mobile station equipment of the structure described above, when mobile stations replacing some of the one or more (P) mobile stations operating as determination stations are selected by the radio base station 50, the channel controlling section 52 associates with the radio base station 50 through the radio interfacing section 51, thereby performing channel control necessary for the mobile stations to operate as determination stations.

That is, in case that any one of the mobile stations operating as determination stations is not permitted to keep operating as a determination station according to movement of the mobile station, the state of operation, or other variation, a mobile station other than the mobile station can be operated as a determination station instead.

Accordingly, determination of a desired determination target station is stably continued while flexibly coping with movement or state of operation of the determination station.

The principle of ninth mobile station equipment in accordance with the present invention is as follows.

A radio interfacing section 51 forms a radio transmission path between this radio interfacing section 51 and a radio base station 50, and transmits and receives information through the radio transmission path. A channel controlling section 52 associates with the radio base station 50 through the radio interfacing section 51, and performs channel control adapted for the wireless zone. A determination target station determination section 81 radiodetermines the location of a determination target station that should be measured. The channel controlling section 52 notifies all or some of the one or more (P) determination stations through the radio interfacing section 51 of positions of these determination stations, respectively, which have been radio-determined by the determination target station determination section 81.

In the mobile station equipment of the structure described above, the radio interfacing section 51 forms a radio transmission path between this radio interfacing section 51 and the radio base station 50, and transmits and receives information through the radio transmission path. The channel controlling section 52 associates with the radio base station 50 through the radio interfacing section 51, and performs channel control adapted for the wireless zone described above.

The determination target station determination section 81 determines the position of a determination target station to be measured. The channel controlling section 52 notifies all or some of the one or more (P) determination stations through the radio interfacing section 51 of locations of these determination stations, respectively, which have been radio-determined as described above. Note that the aforementioned one or more (P) determination stations form a basis for the radio determination of the determination target station.

That is, the mobile station equipment in accordance with the present invention measures the location of a determination target station by itself by radio determination and notifies the results to the aforementioned determination stations and to the determination target station. Therefore, it is possible to assist radio determination of the determination target station performed under association of the determination stations with the determination target station while flexibly coping with the form of the association of the determination stations with the determination target station.

The principle of tenth mobile station equipment in accordance with the present invention is as follows.

A determination target station determination section 81 performs a radio determination under channel control performed by a channel controlling section 52 through a radio channel having desired transmission quality, and discards results of radio determination with used radio channel having transmission quality lower than a prescribed lower limit out of the results of the radio determination.

In the mobile station equipment of this structure, the radio-determination of the determination target station is performed with high accuracy and so the accuracy of the determination of the determination target station is enhanced.

The principle of eleventh mobile station equipment in accordance with the present invention is as follows.

A radio interfacing section 51 forms a radio transmission path between this radio interfacing section 51 and a radio base station 50, and transmits and receives information through the radio transmission path. A channel controlling section 52 associates with the radio base station 50 through the radio interfacing section 51, and performs channel control adapted for the wireless zone. A determination station positioning section 61A measures, by radio determination, the position or positions of one or more (P) determination stations which are located in the same wireless zone as the local station and forms a basis for determination of a determination target station. A channel controlling section 12 notifies all or some of the one or more (P) determination stations and determination target station of the locations through the radio interfacing section 11, the positions having been separately obtained by the determination station positioning section 61A by radio determination.

The mobile station equipment of the structure described above measures the locations of determination stations by itself by radio determination, and notifies the results to the aforementioned determination stations and determination target station. Therefore, it is possible to assist radio determination of the determination target station carried out under association of the determination stations with the determination target station while flexibly coping with the form of the association of the determination stations with the determination target station.

In twelfth mobile station equipment in accordance with the present invention, a determination station positioning section 61A performs radio determination under channel control performed by a channel controlling section 52 through a radio channel having desired transmission quality, and discards results of radio determination with used radio channel having transmission quality lower than a prescribed lower limit out of the results of the radio determination.

The mobile station equipment of the structure described above is capable of finding the positions of determination stations with high accuracy. Consequently, the accuracy of determination of the determination target station can be enhanced.

The principle of thirteenth mobile station equipment in accordance with the present invention is as follows.

A radio interfacing section 51 forms a radio transmission path between this radio interfacing section 51 and a radio base station 50, and transmits and receives information through the radio transmission path. A channel controlling section 52 associates with the radio base station 50 through the radio interfacing section 51, and performs channel control adapted for the wireless zone. Furthermore, the channel controlling section 52 passes information concerning the radio determination through the radio interfacing section 51 among a determination target station undergoing radio determination and one or more (P) determination stations contained in the mobile stations located in the same wireless zone as the local station and forming a basis for the radio determination or among these determination stations, and performs relay of the information concerning the radio determination through the radio interfacing section 51.

The mobile station equipment of the structure described above can assist radio determination by relaying information concerning the aforementioned radio determination without operating as a determination target station or as a determination station.

The principle of fourteenth mobile station equipment in accordance with the present invention is as follows.

A radio interfacing section 51 and a channel controlling section 52 each operate either as a determination station or as a determination target station under channel control performed under association with a radio base station 50 through the radio interfacing section 51.

The mobile station equipment of this structure appropriately measures the location of a determination target station, according to the position of the local station according to the procedure of channel control performed by the local station or assists in a manner associated with measurement of their relative location.

Accordingly, the mobile station equipment in accordance with the present invention performs the determination of a determination target station instead of the radio base station 50. In addition, the mobile station equipment can flexibly adapt itself to the state of operation of the system either as the determination target station or as a basis for the radio determination of the determination target station.

The principle of fifteenth mobile station equipment in accordance with the present invention is as follows.

When a channel controlling section 52 finds that it is impossible to sustain a radio channel formed between the radio base station 50 and the controlling section 52 while the local station is operating as a determination target station, the channel controlling section 52 requests the radio base station 50 to perform processing for eliminating this situation through the radio interfacing section 51.

The radio base station 50 associating with the mobile station equipment of this structure can accurately actuate processing adapted for hindrance to a radio transmission path going from the radio base station 50 to the determination target station or adapted for deterioration in the transmission quality of the radio transmission path.

Therefore, the mobile station equipment in accordance with the present invention can continue to be a stable subject of determination relative to other mobile stations operating as determination stations.

Embodiments of the present invention are hereinafter described with reference to the accompanying drawings.

Figure 3:
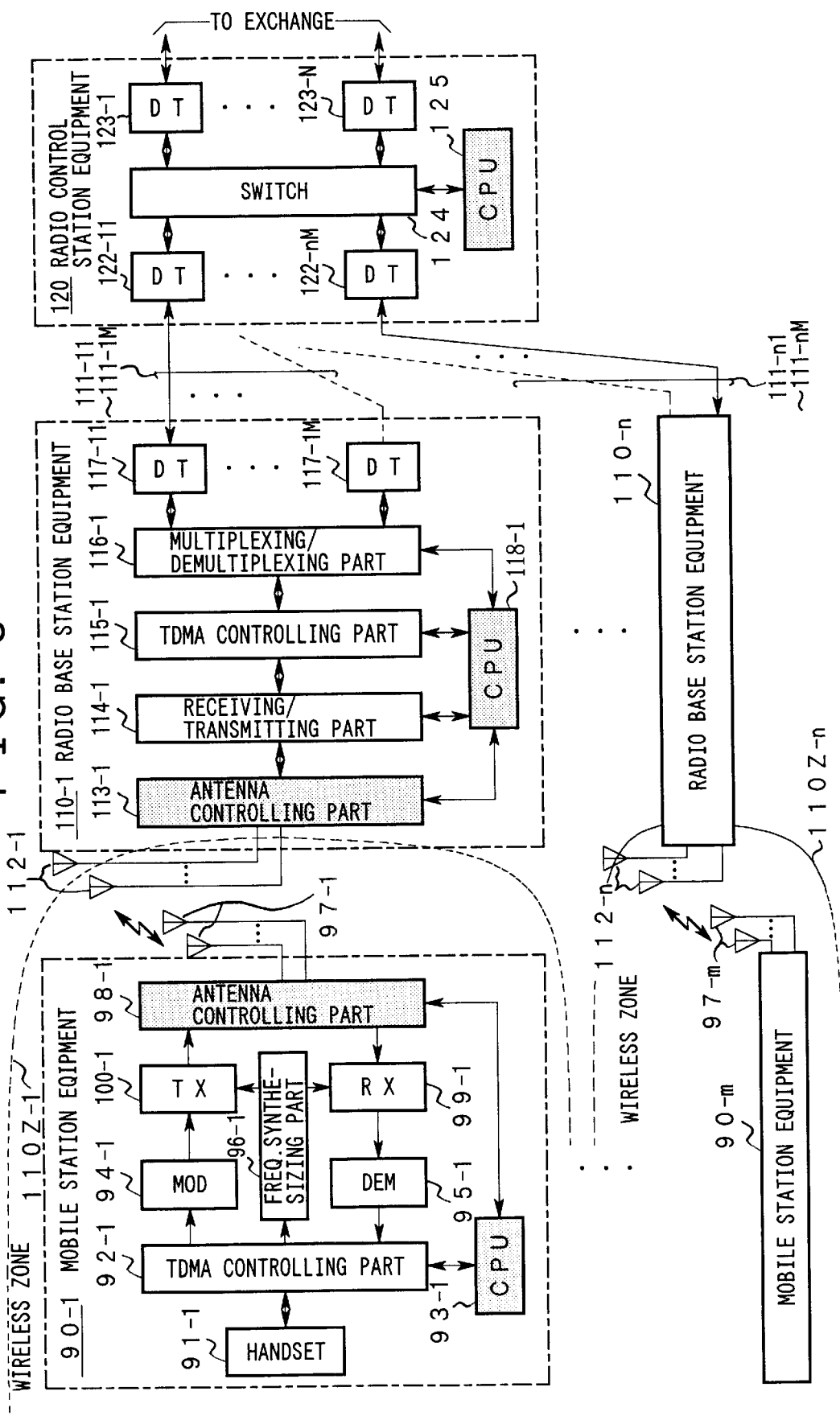
FIG. 3 is a diagram illustrating first through fourth embodiments of the invention.

FIG. 3 is a diagram illustrating first through fourth embodiments of the present invention.

In this diagram, mobile station equipments 90-1 to 90-$m$ are located in any one of wireless zones 110Z-1 to 110Z-n individually formed by radio base station equipments 110-1 to 110-$n$, respectively. These radio base station equipments 110-1 to 110-$n$ are connected with radio control station equipment 120 through communication links 111-11 to 110-1M, . . . , 111-$n$1 to 111-$n$M, respectively. An exchange (not shown) is connected with the radio control station equipment 120.

The mobile station equipment 90-1 comprises a handset 91-1, a TDMA controlling part 92-1 connected with the handset 91-1, a processor (CPU) 93-1, a modulating part (MOD) 94-1, a demodulating part (DEM) 95-1, a frequency synthesizer 96-1, an array antenna 97-1, an antenna controlling part 98-1, a receiving part(RX) 99-1, and a transmitting part (TX) 100-1. The processor 93-1, the modulating part 94-1, the demodulating part 95-1, and the frequency synthesizer 96-1 are connected with the control terminal, the modulation output, the demodulation input, and the frequency control output, respectively, of the TDMA controlling part 92-1. The antenna controlling part 98-1 has an antenna terminal connected with the feeding point of the array antenna 97-1 and a control terminal connected with the corresponding port of the processor 93-1. The receiving part 99-1 is disposed between the reception output of the antenna controlling part 98-1 and the input of the demodulating part 95-1 and has a local frequency input connected with one output of the frequency synthesizer 96-1. The transmitting part (TX) 100-1 is disposed between the output of the modulating part 94-1 and the transmission output of the antenna controlling part 98-1 and has a local frequency input connected with the other output of the frequency synthesizer 96-1.

Since the mobile station equipments 90-2 to 90-$m$ are same in structure as the mobile station equipment 90-1, like components will be indicated by like reference numerals with numerals 2 to m attached in the following description and will not be described nor shown herein.

The radio base station equipment 110-1 comprises an array antenna 112-1, an antenna controlling part 113-1, a receiving/transmitting part 114-1, a TDMA controlling part 1151, a multiplexing/demultiplexing part 116-1, digital interfacing parts (DT) 117-11 to 111-1M, and a processor (CPU) 118-1 having input/output ports connected with their respective control terminals of the antenna controlling part 113-1, receiving/transmitting part 114-1, TDMA controlling part 1151, and multiplexing/demultiplexing part 116-1. The antenna controlling part 113-1, the receiving transmitting part 114-1, the TDMA controlling part 115-1, and the multiplexing/demultiplexing part 116-1 are cascaded to the feeding point of the array antenna 112-1. The digital interfacing parts (DT) 117-11 to 117-1M are disposed between the multiplexing/demultiplexing part 116-1 and respective one end of communication links 111-11 to 117-1M.

Since the radio base station equipments 110-2 to 110-$n$ are same in structure as the radio base station equipment 110-1, like components will be indicated by like reference numerals with attached numerals 2 to n in the following description and will not be described nor shown herein.

The radio control station equipment 120 comprises digital interfacing parts (DT) 122-11 to 122-1M, . . . , 122-$n$1 to 122-$n$M connected to respective other end of the communication links 111-11 to 111-1M, . . . , 111-$n$1 to 111-$n$M, digital interfacing parts (DT) 123-1 to 123-N connected with their respective incoming/outgoing lines of the exchange, a switch 124 having ports connected with the digital interfacing parts 122-11 to 122-1M, . . . , 122-$n$1 to 122-$n$M and 123-1 to 123-N, respectively, and a processor (CPU) 125 having input/output ports connected with their respective control terminals of the switch 124.

The fundamental operation of each part of the present embodiment is first described by referring to FIG. 3.

In the radio base station equipment 110-1, the processor 118-1 associates with the antenna controlling part 113-1, the receiving/transmitting part 114-1, the TDMA controlling part 115-1, and the multiplexing/demultiplexing part 116-1, thereby forming a wireless zone in a area where the mobile station equipment 90-1 to 90-$m$ can be located, through the array antenna 112-1.

In the radio control station equipment 120, office information including channel configuration has been previously given to the processor 125. According to the office information, the processor 125 drives the switch 124 to form paths between all or some of the digital interfacing parts 123-1 to 123-N (e.g., those corresponding to the control channel) and all or some of the digital interfacing parts 122-11 to 122-1M, . . . , 122-$n$1 to 122-$n$M (e.g., those corresponding to a similar control channel).

Furthermore, the processor 125 transmits and receives a signaling signal to and from the exchange through these paths to perform channel control associated with calls (including location registration and handoff) occurring in the mobile station equipment located in the aforementioned wireless zone.

During the process of channel control, the processor 125 transmits and receives control information to and from the radio base station equipment 110-1 to 110-$n$ through paths, of the above-described paths, corresponding to some of the communication links 111-11 to 111-1M, . . . , 111-$n$1 to 111-$n$M.

In the radio base station equipment 110-1 to 110-$n$, for example, the radio base station equipment 110-1, the multiplexing/demultiplexing part 116-1 accepts such control information through some of the digital interfacing parts 117-11 to 117-1M, discerns the control information according to predetermined form, and gives the control information to the processor 118-1.

Office information including channel allocation and other information has been previously given to the processor 118-1. According to the channel allocation, this processor 118-1 associates with the receiving/transmitting part 114-1 to perform processing for obtaining the point when the receiving/transmitting part 114-1 should transmit and receive some radio-frequency signal through the array antenna 112-1, the frequency of the radio-frequency signal, and the transmit power adapted for the procedure of the aforementioned channel control.

During this processing, when the processor 118-1 should transmit some control information (hereinafter referred to as the "radio control information" in order to distinguish it from control information transmitted and received to and from the radio control station equipment 120) to the wireless zone 110Z-1, the processor 118-1 gives the radio control information to the TDMA controlling part 115-1.

The TDMA controlling part 115-1 places the radio control information in a predetermined field of a frame to be sent to the control channel or other desired radio channel, according to the formation of the frame, and gives the frame to the modulation input of the receiving/transmitting part 114-1.

The antenna controlling part 113-1 feeds the array antenna 112-1 in a manner adapted for the procedure of the channel control performed by the processor 118-1.

Accordingly, the receiving/transmitting part 114-1 transmits a transmission wave signal that is modulated with the aforementioned frame and adapted for TDMA system to the wireless zone 110Z-1 through the array antenna 112-1.

In the mobile station equipment 90-1 to 90-$m$ (e.g., the mobile station equipment 90-1), the processor 93-1 performs channel control in a procedure adapted for the channel control performed by the processor 115 installed in the radio control station equipment 120 as mentioned above. During the process of the channel control performed by the processor 93-1, this processor gives instructions including a certain radio frequency at which a desired control channel or speech channel is formed to the TDMA controlling part 92-1 during the period of a time slot (hereinafter referred to as the "reception time slot") which the local station should receive and during the period of a time slot (hereinafter referred to as the "transmission time slot") which the local station should transmit, and instructs the antenna controlling part 98-1 to feed the array antenna 97-1 in a form adapted for the procedure of the channel control.

When the aforementioned instruction is given, the TDMA controlling part 92-1 gives a combination of the period and the receive frequency of the reception time slot included in the instruction or a combination of the period and the transmit frequency of the transmission time slot to the frequency synthesizer 96-1.

The frequency synthesizer 96-1 generates, during the period of the reception time slot described above, a local frequency signal of a frequency corresponding to the receive frequency to feed the local frequency signal to the receiving part 99-1. Conversely, during the period of the transmission time slot, the frequency synthesizer 96-1 generates a local frequency signal corresponding to the transmit frequency to feed it to the transmitting part 100-1.

The antenna controlling part 98-1 extracts received waves which arrive at the array antenna 97-1 and have been modulated by the radio control information described above in every reception time slot, according to the slot formation adapted for the TDMA system described above. The receiving part 99-1 converts the extracted received waves into a predetermined reception intermediate-frequency signal according to the local frequency signal described above, and measures the field strength level of the received waves. The demodulation part 95-1 demodulates the reception intermediate-frequency signal to generate a demodulated signal, and gives this demodulated signal and the field strength level measured by the receiving part 99-1 as described above to the TDMA controlling part 92-1.

The TDMA controlling part 92-1 synchronizes with the demodulated signal in a manner adapted to the TDMA system, thereby extracting radio control information contained in the demodulated signal. The TDMA controlling part 92-1 supplies the field strength level given by the demodulation part 95-1 to the processor 93-1, together with the demodulated signal.

The processor 93-1 analyzes the radio control information according to the procedure of the channel control, and performs processing adapted for the radio control information.

In this processing, the processor 93-1 appropriately drives the TDMA controlling part 92-1 according to the procedure of the channel control, and measures the field strength level of received waves arrived from the radio base station equipments 110-1 to 110-$n$ forming wireless zones 110Z-1 to 110Z-$n$, respectively, through the receiving part 99-1 operating under association with the TDMA controlling part 92-1 and with the frequency synthesizer 96-1.

In a wireless zone (for simplicity, indicated by 110Z-1), of these wireless zones 110Z-1 to 110Z-$n$, specified according to the procedure of channel control, the processor 93-1 makes a transition to a standby state in the wireless zone 110Z-1.

As long as the field strength level of waves received in the wireless zone 110Z-1 exceeds the threshold value set higher than the aforementioned lower limit value, the processor 93-1 maintains the standby state. In this standby state, the processor 93-1 appropriately accepts radio control information given as the arriving received waves from the radio base station equipment 110-1 forming the wireless zone 110Z-1.

Furthermore, the processor 93-1 processes the radio control information in a predetermined manner, and when there is radio control information that should be transmitted to the radio base station equipment 110-1 during the processing, the processor gives the radio control information to the TDMA controlling part 92-1.

Moreover, the processor 93-1 gives an instruction, indicating that speech signal should be transmitted and received through the handset 91-1, to the TDMA controlling part 92-1, in addition to the transmission time slot, reception time slot, the transmit frequency, and receive frequency indicating the speech channel assigned to the local station during the process of the channel control.

In the mobile station equipment 90-1, during the process of transmission of the radio control information and speech signal to the radio base station equipment 110-1, the modulation part 94-1 and the transmitting part 100-1 associate with each other to perform processing having a reversible relation to the processing performed by the demodulation part 95-1 and receiving part 99-1 as mentioned previously. Similarly, the TDMA controlling part 92-1 and the antenna controlling part 98-1 perform processing having a reversible relation to the aforementioned processing. Also, the processor 115 incorporated in the base station control part 120 performs processing that can perform processing having a reversible relation to the aforementioned processing, in step with the receiving/transmitting part 114-1, TDMA controlling part 115-1, multiplexing/demultiplexing part 116-1, and processor 118-1 incorporated in the radio base station equipment 110-1.

Accordingly, the mobile station equipments 90-1 to 90-m can receive communication services through any one piece of the radio base station equipment 110-1 to 110-n under channel control that is voluntarily performed by the processor 115 incorporated in the radio control station equipment 120 under association with the exchange.

Figure 4:
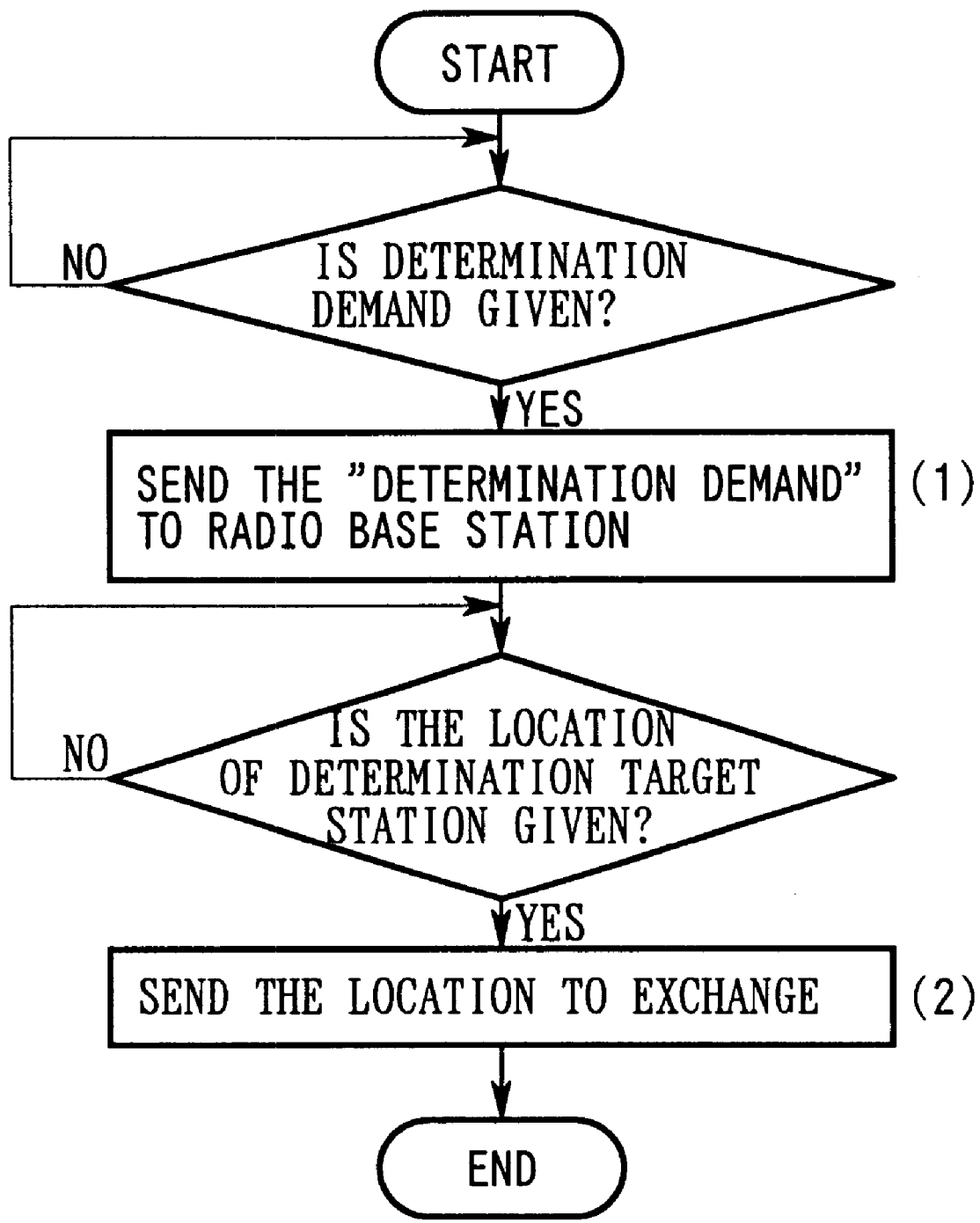
FIG. 4 is a flowchart illustrating a series of operations performed by radio control station equipment in the present embodiment.

FIG. 4 is a flowchart illustrating a series of operations performed by radio control station equipment in the present embodiment.

Figure 5:
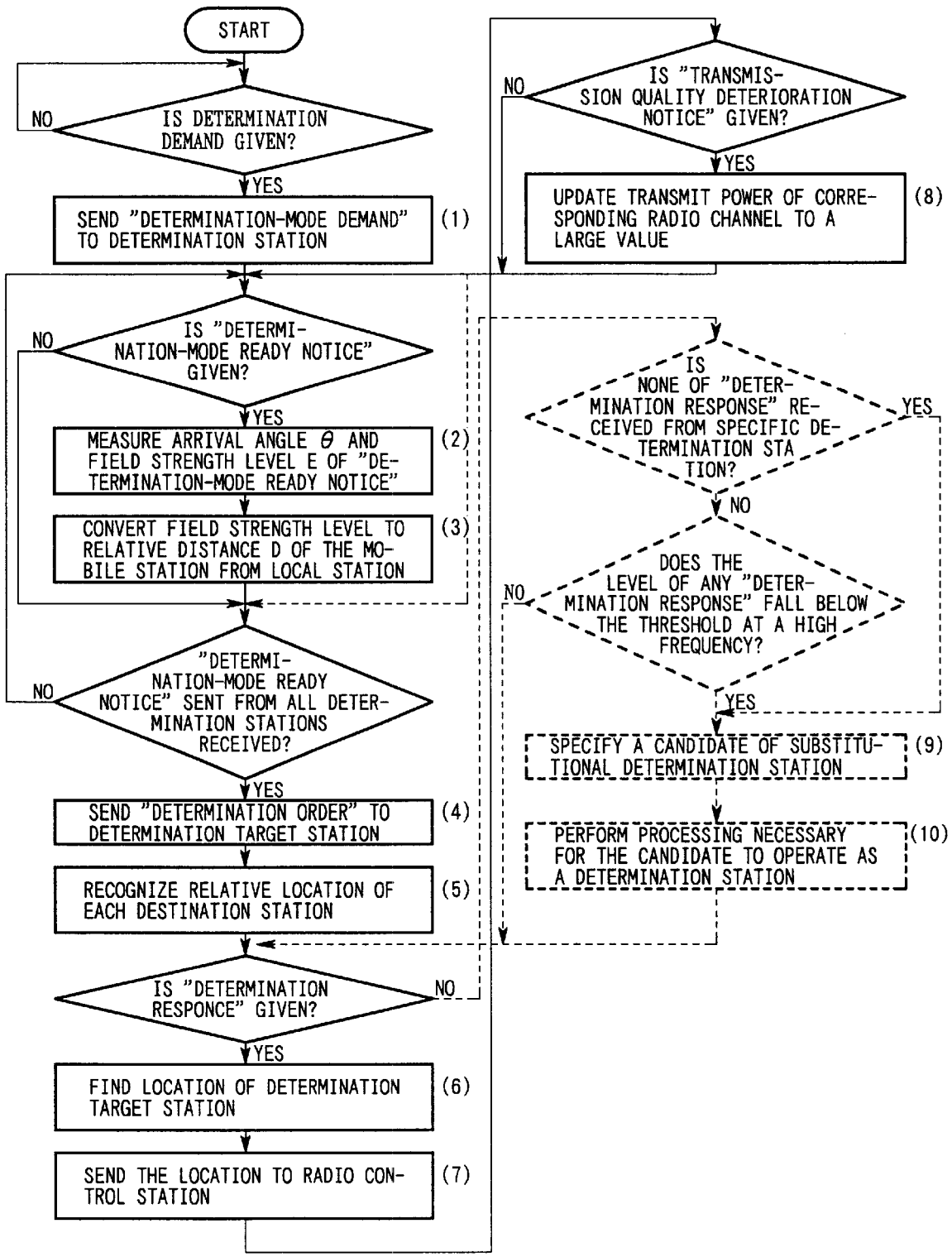
FIG. 5 is a flowchart illustrating a series of operations performed by radio base station equipment in the present embodiment.

FIG. 5 is a flowchart illustrating a series of operations performed by radio base station equipment in the present embodiment.

Figure 6:
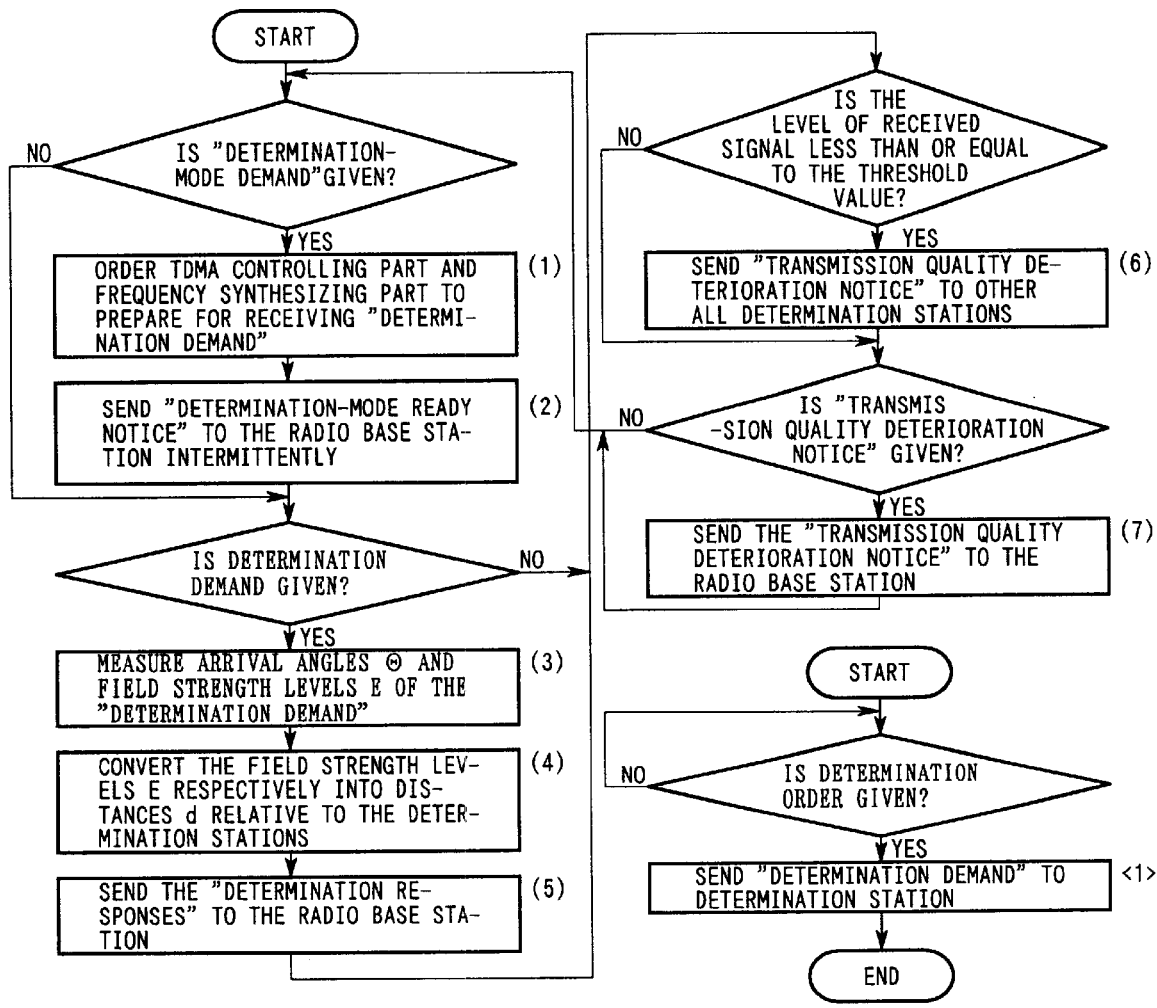
FIG. 6 is a flowchart illustrating a series of the operation performed by mobile station equipment in the present embodiment.

FIG. 6 is a flowchart illustrating a series of the operations performed by mobile station equipment in the present embodiment.

Figure 7:
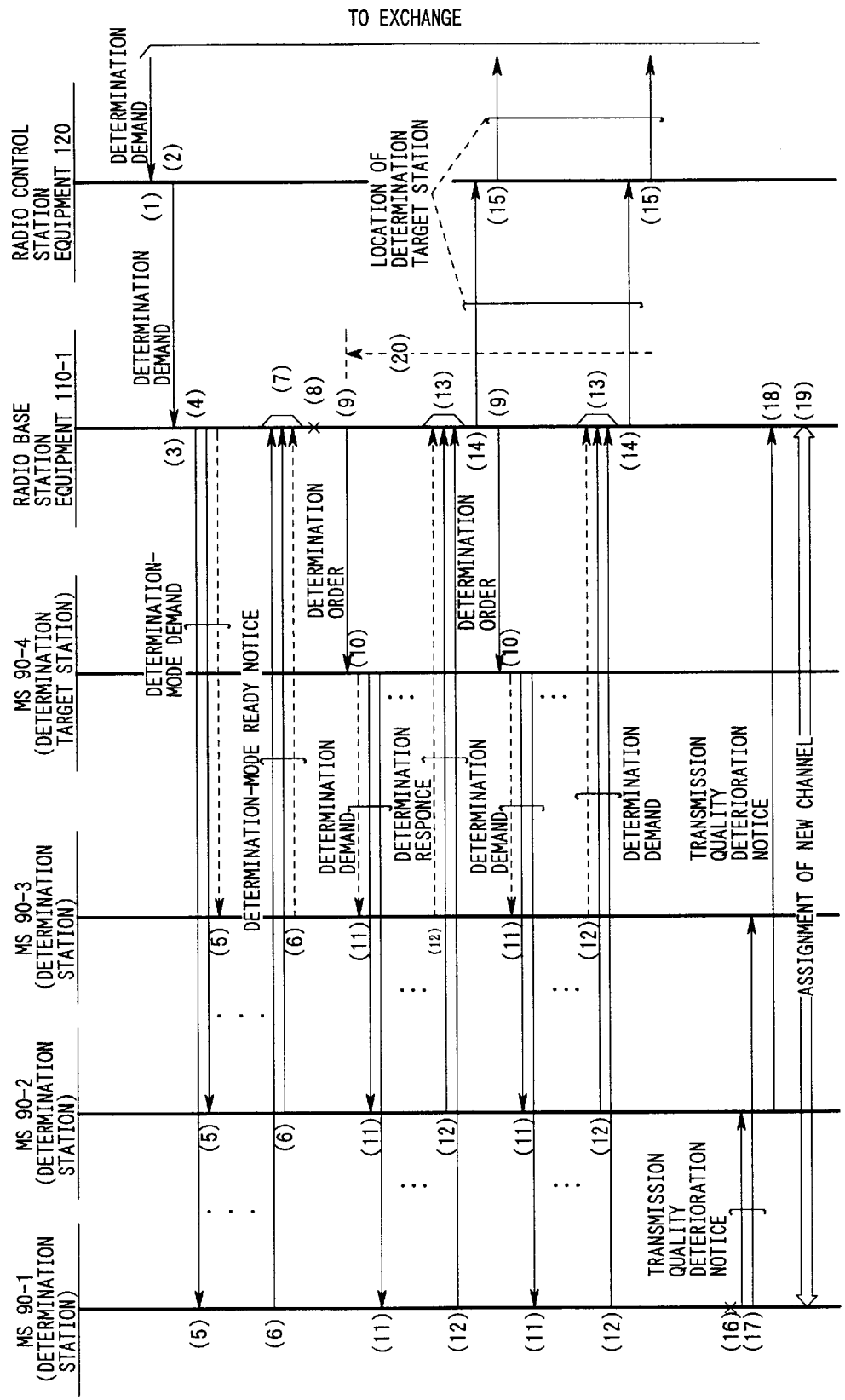
FIG. 7 is a diagram illustrating the operation of the first embodiment of the invention.

FIG. 7 is a diagram illustrating the operation of the first embodiment of the present invention.

The operation of the first embodiment of the present invention is described by referring to FIGS. 3–7 on the assumption that the various parts described above associate in the aforementioned manner.

In radio control station equipment 120, when an exchange sends "determination order" indicating the following items to a processor 125 (FIG. 7(1)), for example, the processor 125 sends the "determination order" as the aforementioned control information to a radio base station equipment 110-1 forming the wireless zone 110Z-1 (FIGS. 4(1) and 7(2)).

The mobile station equipments 90-1 to 90-3 are utilized as determination stations, and a determination target station (for simplicity, it is assumed that it is mobile station equipment 90-4) located in the wireless zone 110Z-1 in common with the mobile station equipments 90-1 to 90-3 should be radio determined.

In the radio base station equipment 110-1, when the processor 118-1 discerns the "determination order" (FIG. 7(3)), the processor sends, to the mobile station equipments 90-1 to 90-3 that should become determination stations in response to the "determination order", "determination-mode demand" containing identification information of the determination target station (mobile station equipment 90-4) and indicating that the mobile station equipment 90-1 to 90-3 should operate as determination station as the aforementioned radio control information (FIGS. 5(1) and 7(4)).

In the mobile station equipments 90-1 to 90-3, when the processors 93-1 to 93-3, respectively, discern the "determination-mode demand" described above (FIG. 7(5)), the processors 93-1 to 93-3 instruct TDMA controlling parts 92-1 to 92-3 and frequency synthesizing part 96-1 to prepare for receiving the received signals (radio-frequency signals modulated by the "determination order" described later) arriving subsequently from a determination target station identified by the identification information contained in the "determination-mode demand" (FIG. 6(1)).

When the processors 93-1 to 93-3 recognizes that the preparations are complete, these processors 93-1 to 93-3 send "determination-mode ready notice" indicating the recognition and containing identification information of the local station, as radio control information, to the radio base station equipment 110-1 intermittently at predetermined first frequency and transmit level (FIGS. 6(2) and 7(6)).

In the radio base station equipment 110-1, the processor 118-1 associates with the TDMA controlling part 115-1, receiving/transmitting part 114-1, and antenna controlling part 113-1, thereby receiving the "determination-mode ready notice" arriving at the array antenna 112-1 from the mobile station equipments 90-1 to 90-3, respectively (FIG. 7(7)). With respect to received waves signifying the "determination-mode ready notice", the processor measures arrival angles $\theta_1$ to $\theta_3$ indicating the directions at which they arrive at the array antenna 112-1 and field strength level levels $E_1$ to $E_3$ (FIG. 5(2)).

Since these arrival angles can be found according to the exploiting of various known techniques such as AOA (Angle of Arrival), the method of finding the arrival angles are not described herein.

Furthermore, the processor 118-1 is notified of the directivities and gains of the array antennas 97-1 to 97-3, 112-1 used to send and receive the aforementioned "determination-mode ready notice" in addition to the aforementioned transmit level as known information. On the basis of these information, the processor 118-1 converts the field strength levels $E_1$–$E_3$ into relative distances $D_1$–$D_3$, respectively, of the mobile station equipments 90-1 to 90-3 from the radio base station equipment 110-1 (FIGS. 5(3) and 7(8)).

Accordingly, the processor 118-1 can obtain the relative locations of the mobile station equipment 90-1 to 90-3 (i.e., determination stations) from the local station as polar coordinates $(D_1, \theta_1), (D_2, \theta_2), (D_3, \theta_3)$ at the aforementioned first frequency.

When the processor 118-1 recognizes that the "determination-mode ready notice" is received from all the mobile station equipments 90-1 to 90-3 (i.e., determination stations), the processor 118-1 sends, to the mobile station equipment 90-4 (i.e., determination target station), "determination order" indicating that the mobile station equipment 90-4 should be an object of determination as radio control information (FIGS. 5(4) and 7(9)).

In the mobile station equipment 90-4, when the processor 93-4 recognizes the "determination order", the processor 90-4 sends "determination order" indicating this recognition and containing identification information of the local station, as radio control information, to mobile station equipments 90-1 to 90-3 (i.e., determination stations) at predetermined second frequency and transmit level (FIGS. 6(1) and 7(10)).

On the other hand, in the mobile station equipments 90-1 to 90-3, with respect to "determination order" containing identification information identical with the identification information contained in the "determination-mode demand" previously received of "determination orders" arrived as received waves at the local station, the processors 93-1 to 93-3 associate with the antenna controlling parts 98-1 to 98-3, receiving parts 99-1 to 99-3, demodulation parts 95-1 to 95-3, TDMA parts 92-1 to 92-3, and frequency synthesizing parts 96-1 to 96-3 and utilize the aforementioned AOA. Thus, the processors 93-1 to 93-3 measure the arrival angles $\Theta_1$ to $\Theta_3$ and field strength levels $e_1$–$e_3$ of the "determination order" (FIGS. 6(3) and 7(11)).

Furthermore, the processors 93-1 to 93-3 are notified of the directivities and gains of the array antennas 97-4, 97-1 to 97-3 used to transmit and receive the aforementioned "determination order" in addition to the transmit level of the "determination order" as known information. The processors 93-1 to 93-3 convert the field strength level levels $e_1$ to $e_3$ into relative distances $d_1$ to $d_3$, respectively, of the mobile station equipment 90-4 from the mobile station equipments 90-1 to 90-3 (FIG. 6(4)).

Therefore, the processors 93-1 to 93-3 can obtain the positions of the mobile station equipment 90-4 (i.e., a determination target station) relative to the local station as polar coordinates $(d_1, \Theta_1)$, $(d_2, \Theta_2)$, $(d_3, \Theta_3)$ at the aforementioned second frequency.

Furthermore, the processors 93-1 to 93-3 sequentially transmit "determination responses" containing these polar coordinates $(d_1, \Theta_1)$, $(d_2, \Theta_2)$, $(d_3, \Theta_3)$, respectively, as radio control information to the radio base station equipment 110-1 (FIGS. 6(5) and 7(12)).

In the radio base station equipment 110-1, the processor 118-1 recognizes the locations of these determination stations (hereinafter referred to as the "determination station locations") as locations relative to the local stations, according to the polar coordinates $(D_1, \theta_1)$, $(D_2, \theta_2)$, $(D_3, \theta_3)$ given separately as "determination-mode ready notice" at the first frequency from the mobile station equipments 90-1 to 90-3 (i.e., determination stations) (FIGS. 5(5) and 7(8)).

Whenever any one of the polar coordinates $(d_1, \Theta_1)$, $(d_2, \Theta_2)$ $d_3, \Theta_3)$ is obtained as the aforementioned "determination response", the processor 118-1 applies any one of 3r navigation (circle intersection determination), theta-theta navigation (line intersection determination), 2r-theta navigation (2r-theta determination), and r-θ navigation (polar coordinate determination) as shown in FIGS. 8(a)–(d), to thereby find the location of the mobile station equipment 90-4 that is a determination target station (FIGS. 4(13) and 5(6)), and sends the position to the processor 125 incorporated in the radio control station equipment 120 (FIGS. 5(7) and 7(14)).

The processing to be performed by the processor 125 according to the 3r navigation, theta-theta navigation, and 2r-theta navigation is as follows.

In the processing according to the 3r navigation, the locations of determination target stations are found as the intersections of circles whose centers are at the locations of the mobile station equipments 90-1 to 90-3 (i.e., determination stations) and which have radii equal to the relative distances $d_1$ to $d_3$, respectively (FIG. 8(a)).

In the processing according to the theta-theta navigation, the location of a determination target station is found as the intersections of straight lines indicating the arrival angles, respectively, from the locations of two mobile stations, of the mobile station equipments 90-1 to 90-3, giving valid arrival angles (FIG. 8(b)).

In the processing according to 2r-theta navigation, a single mobile station of the mobile station equipments 90-1 to 90-3 that gives an valid arrival angle and two mobile stations giving valid relative distances are specified. Note that no limitations are imposed, whether these single mobile stations differ from one of two mobile stations described above. The location of the determination target station is found as the intersection, of two intersections of two circles having centers lying at the locations of these two mobile stations and radii equal to their respective valid relative distances, and a straight line indicating the arrival angle from the location of the single mobile station (FIG. 8(c)).

In the processing according to the r-theta navigation, valid arrival angle and relative distance, each at least one, are given to a coordinate system whose origin is the location of a desired determination station. It is not always necessary that the desired determination system be a determination station that gives either the arrival angle or the relative distance described above. The location of the determination target station is found as polar coordinates given as combinations of azimuth angles and distances which are uniquely found for the valid arrival angle(s) and relative distance(s) described above (FIG. 8(d)).

In the radio control station equipment 120, the processor 125 notifies the exchange of the location notified in this way to an exchange (FIGS. 4(2) and 7(15)) and so this location is appropriately applied for maintenance or operation of a mobile communication system including this exchange.

The level of an radio-frequency signal arriving from the radio base station equipment 110-1 or from the mobile station equipment 90-4 (that is a determination target station) at the mobile station equipment 90-1 can drop to a level at which the mobile station equipment 90-4 must be handed over to other wireless zone.

However, when the level falls below the threshold value (FIG. 7(16)), the mobile station equipment 90-1 sends "transmission quality deterioration notice" containing identification information of the local station to mobile station equipments 90-2, 90-3 (i.e., other determination stations) (FIGS. 6(6) and 7(17)). For simplicity, it is assumed that the mobile station equipment 90-2 and 90-3 are signified by identifiers attached to the "determination-mode demand" by the radio base station equipment 110-1.

When the mobile station equipments 90-2, 90-3 recognize the "transmission quality deterioration notice", the mobile station equipment 90-2 and 90-3 sends this "transmission quality deterioration notice" to the radio base station equipment 110-1 (FIG. 6(7)).

On the other hand, in the radio base station equipment 110-1, when the processor 118-1 recognizes the "transmission quality deterioration notice", the processor 118-1 updates the transmission power of the corresponding radio channel to a larger value (FIGS. 5(8) and 7(18)). Alternatively, the processor 118-1 performs processing for assigning a new radio channel to the mobile station equipment 90-1 indicated by identification information contained in the "transmission quality deterioration notice" (FIG. 7(19)).

Accordingly, even though the transmission characteristics of the radio transmission path vary, the possibility that the determination station shifts to other radio channel uselessly is eliminated with high probability.

In the radio base station equipment 110-1, after sending the aforementioned "determination order" according to the procedure of channel control (FIGS. 5(4) and 7(9)), the processor 118-1 makes a decision as to whether "determination response" is received from the mobile station equipments 90-1 to 90-3 (i.e., determination stations) at a predetermined frequency and a predetermined field strength level (FIG. 7(20)).

When the "determination response" is normally received from all the mobile station equipments 90-1 to 90-3, the processor 118-1 performs no processing at all other than the aforementioned processing.

However, when the "determination response" is not received at all from some of the mobile station equipment 90-1 to 90-3 (e.g., the mobile station equipment 90-3), or when the frequency at which the field strength level of the "determination response" is higher than a predetermined lower limit is lower than a predetermined threshold value, the processor 118-1 associates with the processor 125 incorporated in the radio base station equipment 120, thereby specifying mobile station equipment that is appropriate as a candidate of substitutional determination station (FIG. 5(9)). For simplicity, it is assumed that the agent determination station is indicated by 90-m.

Furthermore, the processor 118-1, in tandem with the mobile station equipment 90-m, sends the "determination-mode demand", and completes reception of the "determination-mode ready notice" in the same way as the procedure described above (FIGS. 7,(4), (7)–(9)). Then, the processor sends "determination order" (FIG. 5(10)), thereby applying the mobile station equipment 90-m as a determination station replacing the mobile station equipment 90-3.

Consequently, the possibility that the number of effectively operating determination stations or the number of valid arrival angles or relative distances obtained under association with these determination stations due to movement of the determination stations or variations in the transmission characteristics of the radio transmission path can be eliminated with high probability.

In this way, in the present embodiment, mobile station equipment selected according to the procedure of channel control operates as determination stations, whereby radio determination of a desired mobile station is achieved.

These determination stations and the determination target station are located in a common wireless zone. The structure of the hardware does not differ greatly from the prior art structure except for antenna system.

Therefore, as long as the mobile station equipments whose number is large enough to use any of the aforementioned 3r navigation, theta-theta navigation, 2r-theta navigation, and r-theta navigation operate as determination stations and "determination station response" containing valid coordinates at a desired combination is obtained by these determination stations, radio determination of the determination target station is accomplished more economically and accurately than conventional art.

In the present embodiment, the processor 118-1 incorporated in the radio base station equipment 110-1 performs subsequent processing (FIG. 5(4), etc.) after "determination-mode ready notice" is received from all determination stations (mobile stations 90-1 to 90-3).

However, the subsequent processing may be continued when valid arrival angles and relative distances permitting use of any one of 3r navigation, theta-theta navigation, 2r-theta navigation, and r-theta navigation are obtained.

In the present embodiment, neither a radio channel to be applied to transmission and reception of "determination-mode demand", "determination-mode ready notice", "determination order", and "determination response" nor the procedure of channel control associated with assignment of the radio channels is described.

However, the procedure of channel control as described above can assume any form as long as it adapts itself to the configuration of the mobile station equipments 90-1 to 90-m and the radio base station equipments 110-1 to 110-n, as well as to the applied multiple access system, channel allocation, and zone configuration.

Furthermore, in the present embodiment, the aforementioned "determination-mode demand", "determination-mode ready notice", "determination order", and "determination response" are directly transmitted to a predetermined destination from a sender.

However, these radio control information may be relayed by any desired mobile station equipment, radio base station equipment, and radio control station equipment as long as desired response is secured and increase in traffic in the radio transmission path and increase in load on various parts are allowed.

Figure 9:
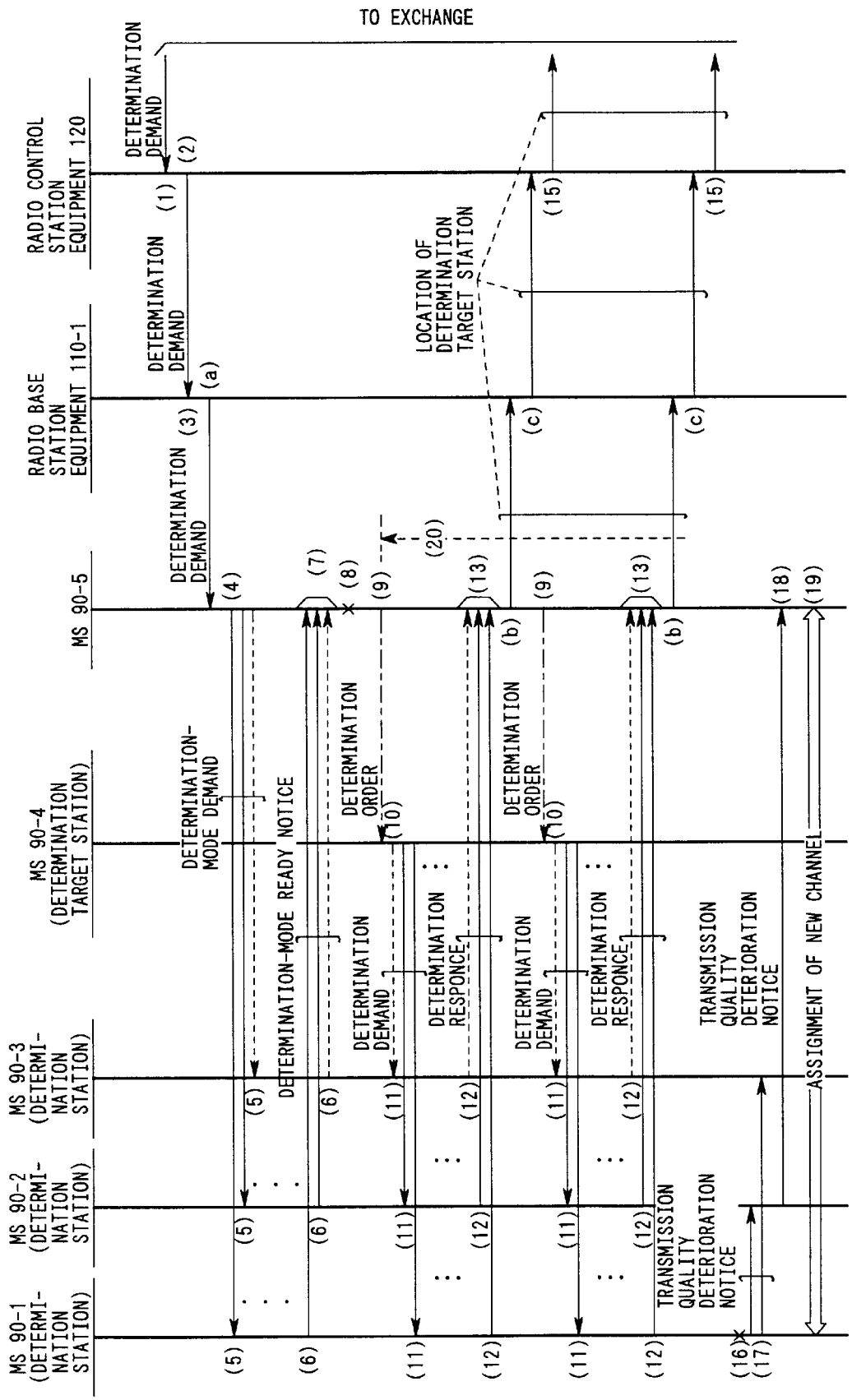
FIG. 9 is a diagram illustrating the operation of the second embodiment of the invention.

FIG. 9 is a diagram illustrating the operation of a second embodiment of the present invention.

In this figure, processing items which correspond to their counterparts of FIG. 7 are indicated by the same reference numerals as used in FIG. 7 and will not be described in detail below.

The operation of the second embodiment of the present invention is hereinafter described by referring to FIGS. 3–6, 8 and 9.

The difference between the present embodiment and the first embodiment described above is that mobile station equipment (hereinafter referred to as the "agent mobile station") corresponding to none of the mobile stations 90-1 to 90-3 (i.e., determination stations) and the mobile station equipment 90-4 (i.e., determination target station) acts for the radio base station equipment 110-1 and the processor 118 incorporated in the radio base station equipment 110-1 performs the following processing to permit this acting operation, as long as radio determination of the mobile stations 90-1 to 90-3 and mobile station equipment 90-4 are concerned.

In the radio base station equipment 110-1, when the processor 118-1 recognizes the "determination order" given from the radio control station equipment 120 (FIG. 9(3)), the processor 118-1 selects the aforementioned agent mobile station according to the procedure of channel control. With respect to this agent mobile station, it is assumed, for simplicity, that the agent mobile station is mobile station equipment 90-5.

Furthermore, the processor 118-1 sends the aforementioned "determination order" as radio control information to the mobile station equipment 90-5 (FIG. 9(a)).

In the mobile station equipment 90-5, when the processor 93-5 recognizes the "determination order", the processor 93-5 sends "determination-mode demand" containing identification information of the local station as an "agent mobile station identifier" indicative of the agent mobile station described above to the mobile station equipments 90-1 to 90-3 (i.e., determination stations).

In the mobile station equipments 90-1 to 90-3, the processors 93-1 to 93-3 recognize the "agent mobile station identifier" contained in the "determination-mode demand", stores the identifier in a predetermined area within a main storage, and sends the identifier to the mobile station equipment 90-5 indicated by the "agent mobile station identifier" instead of the radio base station equipment 110-1, as long as the "determination-mode ready notice" and "determination response" are concerned.

In the mobile station equipment 90-5, if the processor 93-5 recognizes the "determination response" given by any one of the mobile station equipments 90-1 to 90-3, the processor 93-5 sends the aforementioned "location of the determination target station" to the radio base station equipment 110-1 instead of the radio base station equipment 110-1 (FIG. 9(*b*)).

In the radio base station equipment 110-1, the processor 118-1 appropriately relays the "location of the determination target station" to the radio control station equipment 120 (FIG. 9(*c*)).

In this way, in the present embodiment, voluntary processing associated with radio determination of the determination target station and with radio determination of determination stations to be carried out prior to the first-mentioned radio determination is performed instead by the agent mobile station selected according to the procedure of channel control by the radio base station equipment 110-1.

Therefore, even though the load on the radio determination is large, the radio base station equipment 110-1 is prevented from being overloaded. Furthermore, radio determination of a desired determination target station is carried out efficiently.

It is to be noted that any basis for selection of agent mobile stations is not disclosed at all in the present embodiment. However, for example, (1) mobile station equipment installed as a fixed station within a wireless zone or (2) mobile station equipment kept in a waiting state at a perch channel whose transmission characteristics are maintained well may be preferentially selected as an agent mobile station.

The mobile station equipment 90-3 that is a determination station or the mobile station equipment 90-4 that is a determination target station can double as the aforementioned agent mobile station, as long as desired service quality is secured.

Where the mobile station equipment 90-3 operates as an agent mobile station, transmission and reception of the "radio control information", "determination-mode demand", "determination-mode ready notice", and "determination response" indicated by the dotted lines in FIG. 7 can be omitted.

Furthermore, where the mobile station equipment 90-4 operates as an agent mobile station, transmission and reception of radio control information, "determination order" indicated by the chained lines in FIG. 9 can be omitted.

The operation of the third embodiment of the present invention is hereinafter described by referring to FIGS. 3 and 7.

The difference between the present embodiment and the first embodiment described above lies in the procedure of the following processing performed by the processors 93-1 to 93-3, 118-1 in the mobile station equipments 90-1 to 90-3 (i.e., determination stations) and the radio base station equipment 110-1.

As shown in FIG. 10, separate navigation selection tables 118A-1 to 118A-n indicative of navigation(s) (any one of 3r navigation, theta-theta navigation, 2r-theta navigation, and r-theta navigation) applicable according to the following combinations are allocated in certain areas of the main storage of the processors 118-1 to 118-n incorporated in the radio base station equipments 110-1 to 110-n, respectively.

(1) Combinations of determination stations that are transmitting ends of "determination response" including some valid arrival angles and relative distances (2) Combinations of logical states indicating whether the arrival angles and relative distances contained these "determination responses" are valid or not (3) Combinations of the number Nθ of the valid arrival angles and the number Nr of the valid relative distances In the mobile station equipment 90-1 to 90-3, when "determination order" sent from the mobile station equipment 90-4 that is a determination target station is given (for simplicity, it is assumed that the same identification information as the identification information contained in the prior "determination-mode demand" is contained) (FIG. 7(11)), the processors 93-1 to 93-3 associate with the antenna controlling part 98-1 to 98-3, receiving parts 99-1 to 99-3, demodulation parts 95-1 to 95-3, TDMA controlling parts 92-1 to 92-3, and frequency synthesizing parts 96-1 to 96-3, respectively, and according to AOA, thereby measuring the arrival angles $\Theta_1$ to $\Theta_3$ and field strength level levels $e_1$ to $e_3$ of the "determination remand" as described above.

The processors 93-1 to 93-3 make decisions as to whether field strength level levels $e_1$ to $e_3$ are greater or smaller than a first threshold value $e_{th1}$ and than a second threshold value $e_{th2}$ (<eth)

Only in case that the field strength level levels $e_1$ to $e_3$ are greater than the second threshold value $e_{th2}$, the processors 93-1 to 93-3 convert the corresponding field strength level e into relative distance d, and send "determination response" containing polar coordinates consisting of the relative distance d and the corresponding arrival angle $\Theta$ to the radio base station equipment 110-1 (FIG. 7(12)).

However, in case that the field strength level levels $e_1$ to $e_3$ are greater than or equal to the first threshold value $e_{th1}$ and less than the second threshold value $e_{th2}$, the processors 93-1 to 93-3 send "determination response" containing polar coordinates consisting of quasi-relative distance $\Theta$ meaning an invalid relative distance and a corresponding arrival angle $\Theta$ to the radio base station equipment 110-1 (FIG. 7(12)).

Where the field strength level levels $e_1$–$e_3$ are less than the first threshold value $e_{th1}$, the processors 93-1 to 93-3 discard both corresponding field strength level e and arrival angle $\Theta$ and do not send "determination response" to the radio base station equipment 110-1.

On the other hand, in the radio base station equipment 110-1, the processor 118-1 accumulates the "determination responses" given parallel from the mobile station equipments 90-1 to 90-3 at predetermined accuracy. The processor 118-1 identifies the number Nr of valid relative distances d (which do not correspond to the quasi-relative distance $d_D$) and the number Nθ of arrival angles $\Theta$ which are separately contained in the "determination responses".

When the processor 118-1 finds the location of the mobile station equipment 90-4 (i.e., a determination target station) according to "determination responses" given parallel (FIG. 4(13)), the processor 90-4 applies any one of the 3r navigation, theta-theta navigation, 2r-theta navigation, and r-theta navigation indicated by a record, of records contained in the navigation selection table 118A-1 corresponding to both of the following combinations.

(1) Combinations of valid arrival angles and relative distances contained in "determination responses" respectively given by the pieces of the mobile station equipments 90-1 to 90-3 that are determination stations (2) Combinations of the number Nθ of these valid arrival angles and the number Nr of the valid relative distances That is, the location of the mobile station equipment 90-4 is found according to the navigation adapted for the combination even though the combination of the valid arrival angle and relative distance given from each individual determination station varies due to fluctuations of the transmission characteristics of the radio transmission channel between the mobile station equipment 90-4 and the mobile station equipments 90-1 to 90-3 (i.e., determination stations) or between the mobile station equipments 90-1 to 90-4 and the radio base station equipment 110-1.

Accordingly, as long as some combination of valid arrival angles and relative distance or a combination of two valid arrival angles is obtained from the determination station, radio determination of the determination target station 90-4 is achieved on condition that the mobile station equipments 90-1 to 90-3 operate as determination stations.

In the present embodiment, techniques for accomplishing determination of the mobile stations 90-1 to 90-3 that should become determination stations are not described.

However, in case that plural pieces of the radio base station equipments 110-1 to 110-n forming overlapping zones within a wireless zone where the mobile stations 90-1 to 90-3, for example, are located operate as determination stations, during determinations of the mobile stations 90-1 to 90-3, the locations of the mobile stations 90-1 to 90-3 may be found accurately under the following configuration:

(1) A navigation selection table corresponding to the aforementioned navigation selection table 118A-1 is allocated in the main storage of each processor incorporated in the aforementioned plural radio base station equipments.

(2) These processors and the processors 93-1 to 93-3 incorporated in the mobile station equipments 90-1 to 90-3, respectively, as determination stations and determination target stations, respectively, perform processing equivalent to the processing described above.

In the present embodiment, during determination of the mobile station equipment 90-4 that is a determination target station, a navigation to be applied is appropriately selected according to the combination of the valid azimuth angle and relative distance.

However, the processing for accomplishing the selection of the navigation above may be carried out only during the process of determination of the mobile station equipments 90-1 to 90-3 that should be determination stations.

Furthermore, in the present embodiment, a decision as to whether the aforementioned field strength level levels $e_1$ to $e_3$ are effectively applied to the determination is made according to the relation to the first and second threshold values $e_{th1}$ and $e_{th2}$, respectively, in magnitude as mentioned above.

However, as long as the basis for the decision described above is an event that can be recognized during the process of channel control, the basis can be any form of information such as bit error rate of the corresponding radio channel or a syndrome computed during the process of error correction processing.

In the present embodiment, determination of the mobile station equipments 90-1 to 90-3 that should be determination stations and determination of the mobile station equipment 90-4 that is a determination target station are carried out mainly under control of the radio base station equipment 110-1.

However, these determinations are also accomplished even in case that the role of the radio base station equipment 110-1 is replaced by the mobile station equipment 90-5 that is an agent mobile station as shown in FIG. 9. Furthermore, the load on the radio base station equipment 110-1 is allethroughted in the same way as in the second embodiment described above.

The operation of the fourth embodiment of the present invention is hereinafter described by referring to FIGS. 3 and 7. The difference between the present embodiment and the third embodiment described above is the procedure of the following processing performed by the processor 118-1 in the radio base station equipment 110-1.

Navigation selection tables 118B-1 to 118B-n have been previously placed instead of the navigation selection tables 118A-1 to 118A-n, respectively, in certain storage areas of the main storage of each of the processors 118-1 to 118-n incorporated in the radio base station equipments 110-1 to 110-n, respectively.

The difference in structure between the navigation selection tables 118B-1 and 118A-1 lies in the following points as indicated by the dotted lines in FIG. 10.

Only with the combinations of arrival angles and relative distances (including invalid ones) that can be given by the determination stations, even though none of 3r navigation, theta-theta navigation, 2r-theta navigation, and r-theta navigation is applicable, records (hereinafter referred to as posteriority records) indicating a navigation (any one of 3r navigation, theta-theta navigation, 2r-theta navigation, and r-theta navigation) capable of eliminating uncertainties according to geographical restrictions shown as the following items i)–iv) are also placed in the tables.

i) Combinations in which a certain area(s) in which determination target station(s) is/are located or not is/are known as absolute locations or known relative location(s) to the radio base station equipment(s) which is/are determination station(s) or which form(s) wireless zone(s) in which these determination station(s) is/are located.

ii) Combinations of determination stations that are senders of "determination responses" containing some valid arrival angle and relative distance iii) Combinations of the number Nθ of valid arrival angles and the number Nr of valid relative distances iv) "Geographical information" indicating the aforementioned certain area(s)

Such records will hereinafter be referred to as "posteriority records". Records commonly contained in the navigation selection tables 118A-1 to 118A-n will hereinafter be referred to as "priority records".

The navigation selection tables 118B-2 to 118B-n are similar in structure to the determination selection table 118B-1 and so description of them is omitted herein.

Certain areas indicated by the "geographical information" correspond to, for example, the following regions and areas.

(1) Hilly terrain, seas, lakes, rivers, and other areas which are contained in the wireless zone formed by the radio base station equipment 110-1 but in which entry of mobile station equipment corresponding to a determination target station is physically restricted or difficult (2) Areas that should be removed from areas enjoying determination services from a viewpoint of operation and maintenance In the radio base station equipment 110-1, the processor 118-1 accumulates "determination responses" given parallel from the mobile stations 90-1 to 90-3 at a given accuracy, and identifies the number Nr of valid relative distances d (that does not correspond to the aforementioned quasi-relative distance $d_D$) contained in these "determination responses" and the number Nθ of similarly contained arrival angles Θ.

When the processor 118-1 finds the location of the mobile station equipment 90-4 that is a determination target station in response to the "determination responses" given parallel (FIG. 7(13)), the processor 118-1 makes a decision as to whether the navigation selection table 118B-1 contain any priority records corresponding to the combinations (1)–(3) given below.

(1) Combinations of the mobile station equipments 90-1 to 90-3 that are determination stations (2) Combinations of valid arrival angles and relative distances contained in the "determination responses" given by the mobile stations 90-1 to 90-3, respectively (3) Combinations of the number Nθ of valid arrival angles and the number Nr of valid relative distances.

When the result of the decision is true, the processor 118-1 applies any one navigation of 3r navigation, theta-theta navigation, 2r-theta navigation, and r-theta navigation indicated by the corresponding priority record.

However, in case that the result of the decision is false, the processor 118-1 makes a decision as to whether posteriority records corresponding to the aforementioned combinations in (1)–(3) above are contained in the determination selection table 118B-1. Only in case that the result of the decision is true, the processor 118-1 applies a navigation indicated by the posteriority records according to these combinations and "geographical information" contained in the corresponding posteriority records.

That is, even in case that the geographical distribution of mobile station equipments that should become determination stations is not uniform or the number of them is insufficient due to hills, seas, lakes, rivers, and other terrain, or that some limitation even in case that imposed on the installation of radio base station equipment or on the shape of a wireless zone to be formed by the radio base station equipment, the location of the mobile station equipment 90-4 can be found by the most preferable navigation according to the obtained valid arrival angles and relative distance (s).

Accordingly, in the present embodiment, it is possible to flexibly cope with limitations associated with the zone configuration and channel allocation as well as with limitations on the establishments of the radio base stations and radio control stations. Radio determination of a determination target station can be accomplished with high accuracy on condition that mobile station equipment operates as determination stations.

In the present embodiment, only in case that a navigation indicated by all priority records contained in the navigation selection table 118B-1 is difficult to apply, the navigation indicated by the posteriority records can be applied together with corresponding "geographical information".

However, respect to these posteriority records, which may be placed on the navigation selection table 118B-1 on the descending order of maximum number of mobile stations in the corresponding area to be radio determined on basis of determination station(s), may be referenced according to the procedure of standard search processing including the aforementioned decision processing.

In the embodiments described above, the aforementioned "determination order" is given by an exchange.

However, this "determination order" may also be given according to the procedure of channel control by the processor 125 in the radio control station equipment 120 or by any one of the processors 118-1 to 118-*n* incorporated in the radio base station equipments 110-1 to 110-*n*. Alternatively, the demand may be given by an appropriate human operator in the process of maintenance or operation.

Furthermore, in the embodiments described above, the relative distance or distances of one or more determination stations to a radio base station and the relative distances of a determination target station to these determination stations are found according to the field strength level levels E and e described above.

However, in case that synchronization is established between radio base station(s) and determination station(s), and synchronization is established between the determination station(s) and determination target station, the relative distances may also be found by using TOA (time of arrival) or other technique.

Further, in the embodiments described above, the processors 118-1 to 118-*n* incorporated in the radio base station equipment 110-1 to 110-*n* and the processors 93-1 to 93-*m* incorporated in the mobile station equipment 90-1 to 90-*m* associate with each other under channel control mainly provided by the processor 125 in the radio control station equipment 120, thus performing the processing described above.

However, in case that processing equivalent to the above-described processing is performed reliably and desired service quality is secured for the busy hour traffic, the function distribution and load distribution associated with these processors 125, 118-1 to 118-*n*, 93-1 to 93-*m* can assume any form.

In the embodiments described above, the locations of the mobile station equipments 90-1 to 90-3 that should be determination stations are found as locations relative to the radio base station equipment 110-1 under radio determination mainly conducted by the radio base station equipment 110-1.

However, the locations of these determination stations may be found independently by a navigation system, mounted on each determination station, to be sent to the radio base station equipment 110-1 or radio base station equipment 120 through a radio transmission path. Note that the navigation system is not limited to a GPS-based system. For example, self-contained navigation may also be utilized.

In the embodiments described above, any basis to be used for selection of candidate(s) for determination station(s) is not disclosed at all.

However, as long as desired performance is obtained with the structure of the used hardware and software, and there is no needless heightening of the degree of congestion or increasing of call loss to an intolerable level, all of the following mobile stations may be used without exception as the aforementioned determination stations.

(1) A mobile station in which some call including a completed call occurs.

(2) A mobile station forming, in tandem with a radio base station, a radio transmission path whose transmission quality is lower than a predetermined threshold value.

(3) A mobile station whose relative distance to radio base station equipment is found to increase according to the transmission characteristics of a similar radio transmission path.

In the above embodiments, only mobile station equipment is used as determination stations. Where only a small number of mobile stations are located in a wireless zone in common with a determination target station, or where a majority of the mobile stations do not satisfy the criteria for the selection of determination stations, the radio base station equipment can act also as determination stations.

In other cases, the radio base station equipment may also be selected as determination stations in favor as long as the equipment does not lapse into overloaded state or is unlikely to lapse into overloaded state.

Where the radio base station equipment 110-1 acts also as the mobile station equipment 90-3 that is a determination station, transmission and reception of the "determination-mode demand", "determination-mode ready notice", "determination order", and "determination response" between the radio base station equipment 110-1 and the mobile station equipment 90-1 or 90-2 that is a determination station or the mobile station equipment 90-4 that is a determination target station as indicated by the dotted lines in FIG. 7 can be omitted.

In the embodiments described above, the results of determination of a determination target station achieved by application of the present invention are found by the mobile station equipment 90-5 that is an agent mobile station or the radio base station equipment 110-1 are sent to the radio base station equipment 110-1 and to the radio control station equipment 120. Furthermore, the results are sent to the exchanger accordingly.

The results of the determination may be sent to mobile station equipment for relaying radio control information described above or to the mobile station equipment 90-4 that is a determination target station.

In the embodiments described above, the present invention is applied to a mobile communication system making use of TDMA.

It is to be understood, however, the present invention is not limited to such a mobile communication system. Rather, the invention can be applied to any mobile communication system utilizing any multiple access system (such as CDMA or FDMA), zone configuration, and channel allocation.

In the embodiments described above, no mention is made of radio channels used to send and receive "determination-mode demand", "determination-mode ready notice", "determination order", "determination order", and "determination response". In addition, no mention is made of the procedure of channel control associated with the radio channels.

However, in case that increase in traffic in the radio transmission path or line transmission system is permitted with adaptability as to the zone configuration and channel configuration kept, the above-described radio channel(s) can be any radio channel(s) used for transmission of broadcasting information, paging, or any other radio channel.

In the embodiments described above, the level and the angle of arrival of an RF signal arriving from one or more determination stations at a determination target station are found by the determination target station, and the location of this determination target station is achieved according to these level and angle of arrival.

However, in case that information necessary for association between the determination stations, determination target station, and radio base station equipment is reliably passed to each other, the determination may be contrarily achieved according to the level and arrival angle of an RF signal arriving at the determination stations from the determination target station. On a two-dimensional plane, the difference with the arrival angle obtained by the determination target station is given by $\pi$-radian angle.

Figure 8:
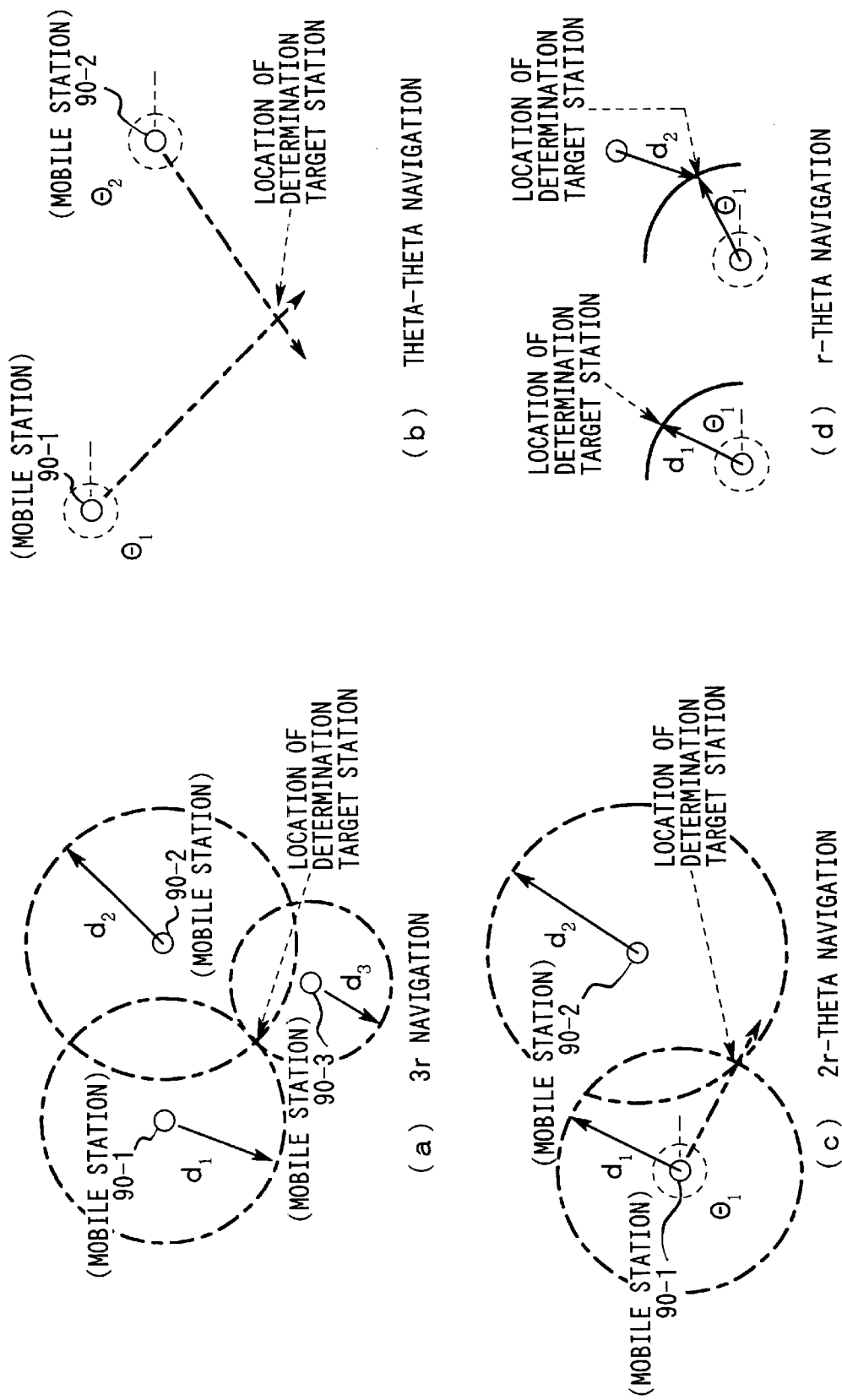
FIG. 8 is a diagram illustrating the principles of 3r navigation, theta-theta navigation, and 2r-theta navigation.

In the embodiments described above, a function indicating a straight line or circle as indicated by the chained lines in FIG. 8 is applied to 3r navigation, theta-theta navigation, 2r-theta navigation, and r-theta navigation.

This function can be any function, as long as it is uniquely defined according to the obtained arrival angle and relative distance and involves no discontinuous points.

In the embodiments described above, the mobile station equipments 90-1 to 90-$m$ operate as determination stations or as determination target stations.

However, these mobile station equipments 90-1 to 90-$m$ may not have a function to operate as determination stations or determination target stations. Furthermore, these mobile station equipments 90-1 to 90-$m$ may have a function of simply relaying information that is sent and received between the radio base station equipments 110-1 to 110-$n$ and known determination stations and determination target station or between these determination stations and which should be used for desired radio determination.

The radio base station equipments 110-1 to 110-$n$ are main components for performing computations associated with radio determination of the mobile station equipment 90-4 that is a determination target station.

However, these mobile station equipments 110-1 to 110-$n$ do not have functions of performing these computations or acting as determination stations. Rather, these pieces of mobile station equipments 110-1 to 110-$n$ may have a function of simply relaying information which is sent and received between known determination stations or between these determination stations and determination target station which should be used for desired radio determination.

In the embodiments described above, the locations of individual determination stations are found as locations relative to radio base station equipment.

However, in case that the absolute location of radio base station equipment is given, the locations of the determination stations described above may be found as absolute locations, each equal to the sum of the given absolute location and the aforementioned relative location.

Furthermore, in the embodiments described above, the location of a determination target station is found as an absolute location relative to radio base station equipment.

However, in case that the locations of determination stations are given as absolute locations as mentioned previously, the location of the determination target station may be found as an absolute location on basis of the given absolute value.

In the embodiments described above, radio determination is performed according to plane coordinates.

As long as the invention is applied to the distribution of terrain and objects in a area where a determination target station, mobile stations, and radio base station used for radio determination of the determination target station is located, the present invention is similarly applicable to spherical coordinate and other desired coordinate systems in case that the area is so wide that application of plane coordinates is not permitted.

In the embodiments described above, radio determination is performed only on determination target stations located in the wireless zone in common with radio determination stations, wherein the radio determination is done on basis of the determination stations.

However, in case that all radio control information necessary for accomplishment of desired radio determination is passed through a line transmission system and the closest radio base station or through radio transmission paths directly formed between all determination stations, for example, it is not always necessary that the above-described determination target station be located in a wireless zone where these determination stations are located.

In the embodiments described above, the association between determination stations and determination target station is performed under channel control provided by radio base station during the process of radio determination of the determination target station on the basis of the determination stations.

The association described above may also be achieved through radio transmission paths when these paths are directly formed between all determination stations and determination target station under the used multiple access system, channel allocation (including frequency allocation), and zone configuration.

In the embodiments described above, there are provided radio control station equipment 120 and radio base station equipments 110-1 to 110-n which form separate wireless zones under the control of the radio control station equipment 120 and which performs channel control of calls occurring in these wireless zone according to a load distribution system.

These radio control station equipment 120 and radio base station equipments 110-1 to 110-n may be combined into a unit when it complies with the size of a desired system and other configurations.

The invention is not limited to the above embodiments and various modifications may be made without departing from the spirit and the scope of the invention. Any improvement may be made in all or part of the components.

What is claimed is:

1. A radio base station equipment comprising:
    a radio interfacing means forming a wireless zone to form radio transmission paths between said radio interfacing means and mobile stations located in said wireless zone, and for sending and receiving transmission information through the radio transmission paths; and
    a channel controlling means performing channel control adapted for said wireless zone in liaison with said mobile stations through said radio interfacing means,
    collecting positioning results of a determination target station from a determination station of said mobile stations composed of all or some of arrival angles and relative distances,
    computing a location of said determination target station based on said positioning result.

2. The radio base station equipment according to claim 1, wherein said channel controlling means obtains a location, according to a predetermined navigation, found by a singular or plural P of determination station(s), respectively, according to a procedure of said channel control.

3. The radio base station equipment according to claim 2, further comprising a determination station positioning means for radio-determining the location(s) of said singular or plural P of determination station(s), and wherein
    said channel controlling means applies said radio-determined location(s) of said singular or plural P of determination station(s) by said determination station positioning means together with the determination results.

4. The radio base station equipment according to claim 3, wherein said determination station positioning means monitors transmission quality in radio transmission paths used for said radio determination and discards results of the radio determination obtained through the radio transmission paths when the transmission quality is lower than a predetermined lower limit.

5. The radio base station equipment according to claim 4, wherein said channel controlling means applies one of plural applicable navigation which conforms with a combination of obtained location and ingested result of determination of said singular or plural P of determination station(s) and with prescribed selection criteria.

6. The radio base station equipment according to claim 5, further comprising a geographical database registered in advance a combination of an area in which a determination target station to be radio-determined according to said singular or plurality P of determination station(s) or an area in which said determination target station cannot be located, and a navigation capable of eliminating an uncertainty of the location of said determination target station when one of said areas are used in determination done in said navigation, in correspondence to a combination of locations of said singular or plural P of determination station(s) and wherein
    said channel controlling means applies the area and an identifier of navigation registered in said geographical database corresponding to obtained locations and ingested results of determination of said singular or plural P of determination station(s).

7. The radio base station equipment according to claim 3, wherein said channel controlling means applies one of plural applicable navigation which conforms with a combination of obtained location and ingested result of determination of said singular or plural P of determination station(s) and with prescribed selection criteria.

8. The radio base station equipment according to claim 7, further comprising a geographical database registered in advance a combination of an area in which a determination target station to be radio-determined according to said singular or plurality P of determination station(s) or an area in which said determination target station cannot be located, and a navigation capable of eliminating an uncertainty of the location of said determination target station when one of said areas are used in determination done in said navigation, in correspondence to a combination of locations of said singular or plural P of determination station(s) and wherein
    said channel controlling means applies the area and an identifier of navigation registered in said geographical database corresponding to obtained locations and ingested results of determination of said singular or plural P of determination station(s).

9. The radio base station equipment according to claim 2; wherein said channel controlling means applies one of plural applicable navigation which conforms with a combination of obtained location and ingested result of determination of said singular or plural P of determination station(s) and with prescribed selection criteria.

10. The radio base station equipment according to claim 9, further comprising a geographical database registered in advance a combination of an area in which a determination target station to be radio-determined according to said singular or plurality P of determination station(s) or an area in which said determination target station cannot be located, and a navigation capable of eliminating an uncertainty of the location of said determination target station when one of said areas are used in determination done in said navigation, in correspondence to a combination of locations of said singular or plural P of determination station(s) and wherein
    said channel controlling means applies the area and an identifier of navigation registered in said geographical database corresponding to obtained locations and ingested results of determination of said singular or plural P of determination station(s).

11. The radio base station equipment according to claim 1, further comprising a determination station positioning means for radio-determining the location(s) of a singular or plural P of determination station(s), and wherein said channel controlling means applies said radio-determined location(s) of said singular or plural P of determination station(s) by said determination station positioning means together with the determination results.

12. The radio base station equipment according to claim 4, wherein said determination station positioning means monitors transmission quality in radio transmission paths used for said radio determination and discards results of the radio determination obtained through the radio transmission paths when the transmission quality is lower than a predetermined lower limit.

13. The radio base station equipment according to claim 12, wherein said channel controlling means applies one of plural applicable navigation which conforms with a combination of obtained location and ingested result of determination of said singular or plural P of determination station(s) and with prescribed selection criteria.

14. The radio base station equipment according to claim 13, further comprising a geographical database registered in advance a combination of an area in which a determination target station to be radio-determined according to said singular or plurality P of determination station(s) or an area in which said determination target station cannot be located, and a navigation capable of eliminating an uncertainty of the location of said determination target station when one of said areas are used in determination done in said navigation, in correspondence to a combination of locations of said singular or plural P of determination station(s) and wherein said channel controlling means applies the area and an identifier of navigation registered in said geographical database corresponding to obtained locations and ingested results of determination of said singular or plural P of determination station(s).

15. The radio base station equipment according to claim 11, wherein said channel controlling means applies one of plural applicable navigation which conforms with a combination of obtained location and ingested result of determination of said singular or plural P of determination station(s) and with prescribed selection criteria.

16. The radio base station equipment according to claim 8, further comprising a geographical database registered in advance a combination of an area in which a determination target station to be radio-determined according to said singular or plurality P of determination station(s) or an area in which said determination target station cannot be located, and a navigation capable of eliminating an uncertainty of the location of said determination target station when one of said areas are used in determination done in said navigation, in correspondence to a combination of locations of said singular or plural P of determination station(s) and wherein said channel controlling means applies the area and an identifier of navigation registered in said geographical database corresponding to obtained locations and ingested results of determination of said singular or plural P of determination station(s).

17. The radio base station equipment according to claim 1, wherein said channel controlling means applies one of plural applicable navigation which conforms with a combination of obtained location and ingested result of determination of a singular or plural P of determination station(s) and with prescribed selection criteria.

18. The radio base station equipment according to claim 17 further comprising a geographical database registered in advance a combination of an area in which a determination target station to be radio-determined according to said singular or plurality P of determination station(s) or an area in which said determination target station cannot be located, and a navigation capable of eliminating an uncertainty of the location of said determination target station when one of said areas are used in determination done in said navigation, in correspondence to a combination of locations of said singular or plural P of determination station(s) and wherein said channel controlling means applies the area and an identifier of navigation registered in said geographical database corresponding to obtained locations and ingested results of determination of said singular or plural P of determination station(s).

19. The mobile station equipment according to claim 18, wherein said radio interfacing means and said channel controlling means each operate as either one of said determination station or said determination target station, under channel control performed in association with said radio base station through said radio interfacing means.

20. The mobile station equipment according to claim 19, wherein said channel controlling means demands said radio base station a processing through said radio interfacing means, for solving a state in which the seizure of a radio channel between a local station and said radio base station while said local station is operating as a determination target station cannot be maintained, when said state is identified.

21. The radio base station equipment according to claim 1, wherein said channel controlling means selects from said mobile stations singular or plural P of mobile station(s) satisfying predetermined criteria according to procedure of said channel control and performs channel control necessary for the selected mobile stations to operate as determination stations.

22. The radio base station equipment according to claim 21, wherein said channel controlling means makes a decision as to whether the predetermined conditions on a singular or plural P of determination station(s) selected as said determination stations are satisfied according to the procedure of the channel control selects a mobile station capable of replacing said mobile station when an mobile station having false as a result of the decision is identified, and performs channel control necessary to operate this mobile station as a determination station.

23. The radio base station equipment according to claim 1, wherein said radio interfacing means and said channel controlling means operate as determination stations according to a procedure of said channel control.

24. A radio base station equipment comprising:

a radio interfacing means forming a wireless zone to form radio transmission paths between said radio interfacing means and mobile stations located in wireless zone, and for sending and receiving transmission information through the radio transmission paths;

a channel controlling means performing channel control adaptable for said wireless zone in liaison with said mobile stations through said radio interfacing means; and a determination station positioning means for radio-determining locations of a singular or plural P of determination station(s), of said mobile stations, which is to be a basis for radio determination of a determination target station, in which the determination station (s) and the determination target station are mobile stations, and wherein said channel controlling means notifies locations of all or some of said singular or plural P of determination station(s) individually radio-determined by said determination station positioning means, through said radio-interfacing means, to all or some of said determination stations and said determination target station, in which the determination stations perform desired determination of said determination target station.

25. The radio base station equipment according to claim 24, wherein said determination station positioning means performs radio determination through radio channels assured desired transmission quality under channel control performed by said channel controlling means and
   discards a result contained in results of said radio determination, said result indicating transmission quality of applied radio channels below a predetermined lower limit.

26. The radio base station equipment according to claim 24, wherein said radio interfacing means and said channel controlling means operate as determination stations according to a procedure of said channel control.

27. The mobile station equipment according to claim 23, wherein said radio interfacing means and said channel controlling means each operate as either one of said determination station or said determination target station, under channel control performed in association with said radio base station through said radio interfacing means.

28. The mobile station equipment according to claim 27, wherein said channel controlling means demands said radio base station a processing through said radio interfacing means, for solving a state in which the seizure of a radio channel between a local station and said radio base station while said local station is operating as a determination target station cannot be maintained, when said state is identified.

29. The mobile station equipment according to claim 24, wherein said radio interfacing means and said channel controlling means each operate as either one of said determination station or said determination target station, under channel control performed in association with said radio base station through said radio interfacing means.

30. The mobile station equipment according to claim 29, wherein said channel controlling means demands said radio base station a processing through said radio interfacing means, for solving a state in which the seizure of a radio channel between a local station and said radio base station while said local station is operating as a determination target station cannot be maintained, when said state is identified.

31. A radio base station equipment comprising:
   a radio interfacing means forming a wireless zone to form radio transmission paths between said radio interfacing means and mobile stations located in said wireless zone, for sending and receiving transmission information through the radio transmission paths and
   a channel controlling means performing channel control adapted for said wireless zone in liaison with said mobile stations through said radio interfacing means, wherein
   said channel controlling means performs, through said radio interfacing means, a relay of information which relates to a radio determination, in one or both of:
   between a determination target station to be an object of radio determination and a singular or plural P of determination station(s) to be the basis of said radio determination, among said mobile stations and/or
   between said plural P of determination stations,
   in which the determination stations and the determination target station are mobile stations.

32. The radio base station equipment according to claim 31, wherein said radio interfacing means and said channel controlling means operate as determination stations according to a procedure of said channel control.

33. The mobile station equipment according to claim 31, wherein said radio interfacing means and said channel controlling means each operate as either one of said determination station or said determination target station, under channel control performed in association with said radio base station through said radio interfacing means.

34. The mobile station equipment according to claim 33, wherein said channel controlling means demands said radio base station a processing through said radio interfacing means, for solving a state in which the seizure of a radio channel between a local station and said radio base station while said local station is operating as a determination target station cannot be maintained, when said state is identified.

35. A mobile station equipment comprising:
   a radio interfacing means forming radio transmission paths between the radio interfacing means and a radio base station, and for sending and receiving transmission information through said radio transmission paths, and
   a channel controlling means associating with said radio base station through said radio interfacing means to perform channel control adapted for wireless zone, wherein
   said channel controlling means collects positioning results composed of all or some of arrival angles relative distances, which are results of radio determination individually done by a singular or plurality P of determination station(s), located in the wireless zone in common with a local station, whose location(s) is/are given under said channel control, and which is/are the basis of a determination of a determination target station in liaison with the determination station(s), through said radio interfacing means, in which the determination station(s) and the determination target station are mobile stations, and
   applies a predetermined navigation to said positioning result, to compute the location of said determination target station.

36. The mobile station equipment according to claim 35, wherein
   said channel controlling means obtains a location, according to the predetermined navigation, found by said singular or plural P of determination station(s), respectively, according to a procedure of said channel control.

37. The mobile station equipment according to claim 36, further comprising a determination station positioning means for radio-determining the location(s) of said singular or plural P of determination station(s), and wherein
   said channel controlling means applies said radio-determined location(s) of said singular or plural P of determination station(s) by said determination station positioning means together the determination results.

38. The mobile station equipment according to claim 37, wherein said determination station positioning means monitors transmission quality in radio transmission paths used for said radio determination and discards results of the radio determination obtained through the radio transmission paths when the transmission quality is lower than a predetermined lower limit.

39. The mobile station equipment according to claim 38, wherein said channel controlling means applies one of plural applicable navigation which conforms with a combination of obtained location and ingested result of determination of said singular or plural P of determination station(s) and with prescribed selection criteria.

40. The mobile station equipment according to claim 35, further comprising a geographical database registered in advance a combination of an area in which a determination target station to be radio-determined according to said singular or plurality P of determination station(s) or an area in which said determination target station cannot be located, and a navigation capable of eliminating an uncertainty of the location of said determination target station when one of said areas are used in determination done in said navigation, in correspondence to a combination of locations of said singular or plural P of determination station(s) and wherein said channel controlling means applies the area and an identifier of navigation registered in said geographical database corresponding to obtained locations and ingested results of determination of said singular or plural P of determination station(s).

41. The mobile station equipment according to claim 40, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

42. The mobile station equipment according to claim 41, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

43. The mobile station equipment according to claim 39, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

44. The mobile station equipment according to claim 43, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

45. The mobile station equipment according to claim 38, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

46. The mobile station equipment according to claim 45, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

47. The mobile station equipment according to claim 37, wherein said channel controlling means applies one of plural applicable navigation which conforms with a combination of obtained location and ingested result of determination of said singular or plural P of determination station(s) and with prescribed selection criteria.

48. The mobile station equipment according to claim 47, further comprising a geographical database registered in advance a combination of an area in which a determination target station to be radio-determined according to said singular or plurality P of determination station(s) or an area in which said determination target station cannot be located, and a navigation capable of eliminating an uncertainty of the location of said determination target station when one of said areas are used in determination done in said navigation, in correspondence to a combination of locations of said singular or plural P of determination station(s) and wherein said channel controlling means applies the area and an identifier of navigation registered in said geographical database corresponding to obtained locations and ingested results of determination of said singular or plural P of determination station(s).

49. The mobile station equipment according to claim 48, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

50. The mobile station equipment according to claim 49, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

51. The mobile station equipment according to claim 47, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

52. The mobile station equipment according to claim 51, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

53. The mobile station equipment according to claim 37, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

54. The mobile station equipment according to claim 53, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

55. The mobile station equipment according to claim 36, wherein said channel controlling means applies one of plural applicable navigation which conforms with a combination of obtained location and ingested result of determination of said singular or plural P of determination station(s) and with prescribed selection criteria.

56. The mobile station equipment according to claim 55, further comprising a geographical database registered in advance a combination of an area in which a determination target station to be radio-determined according to said singular or plurality P of determination station(s) or an area in which said determination target station cannot be located, and a navigation capable of eliminating an uncertainty of the location of said determination target station when one of said areas are used in determination done in said navigation, in correspondence to a combination of locations of said singular or plural P of determination station(s) and wherein said channel controlling means applies the area and an identifier of navigation registered in said geographical database corresponding to obtained locations and ingested results of determination of said singular or plural P of determination station(s).

57. The mobile station equipment according to claim 56, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

58. The mobile station equipment according to claim 57, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

59. The mobile station equipment according to claim 55, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

60. The mobile station equipment according to claim 59, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

61. The mobile station equipment according to claim 36, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

62. The mobile station equipment according to claim 61, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

63. The mobile station equipment according to claim 35, further comprising a determination station positioning means for radio-determining the location(s) of said singular or plural P of determination station(s), and wherein said channel controlling means applies said radio-determined location(s) of said singular or plural P of determination station(s) by said determination station positioning means together the determination results.

64. The mobile station equipment according to claim 63, wherein said determination station positioning means monitors transmission quality in radio transmission paths used for said radio determination and discards results of the radio determination obtained through the radio transmission paths when the transmission quality is lower than a predetermined lower limit.

65. The mobile station equipment according to claim 64, wherein said channel controlling means applies one of plural applicable navigation which conforms with a combination of obtained location and ingested result of determination of said singular or plural P of determination station(s) and with prescribed selection criteria.

66. The mobile station equipment according to claim 65, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

67. The mobile station equipment according to claim 66, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

68. The mobile station equipment according to claim 65, further comprising a geographical database registered in advance a combination of an area in which a determination target station to be radio-determined according to said singular or plurality P of determination station(s) or an area in which said determination target station cannot be located, and a navigation capable of eliminating an uncertainty of the location of said determination target station when one of said areas are used in determination done in said navigation, in correspondence to a combination of locations of said singular or plural P of determination station(s) and wherein said channel controlling means applies the area and an identifier of navigation registered in said geographical database corresponding to obtained locations and ingested results of determination of said singular or plural P of determination station(s).

69. The mobile station equipment according to claim 68, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

70. The mobile station equipment according to claim 69, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

71. The mobile station equipment according to claim 64, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

72. The mobile station equipment according to claim 71, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

73. The mobile station equipment according to claim 63, wherein said channel controlling means applies one of plural applicable navigation which conforms with a combination of obtained location and ingested result of determination of said singular or plural P of determination station(s) and with prescribed selection criteria.

74. The mobile station equipment according to claim 73, further comprising a geographical database registered in advance a combination of an area in which a determination target station to be radio-determined according to said singular or plurality P of determination station(s) or an area in which said determination target station cannot be located, and a navigation capable of eliminating an uncertainty of the location of said determination target station when one of said areas are used in determination done in said navigation, in correspondence to a combination of locations of said singular or plural P of determination station(s) and wherein said channel controlling means applies the area and an identifier of navigation registered in said geographical database corresponding to obtained locations and ingested results of determination of said singular or plural P of determination station(s).

75. The mobile station equipment according to claim 74, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

76. The mobile station equipment according to claim 75, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

77. The mobile station equipment according to claim 73, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

78. The mobile station equipment according to claim 77, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

79. The mobile station equipment according to claim 63, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

80. The mobile station equipment according to claim 79, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

81. The mobile station equipment according to claim 35, wherein said channel controlling means applies one of plural applicable navigation which conforms with a combination of obtained location and ingested result of determination of said singular or plural P of determination station(s) and with prescribed selection criteria.

82. The mobile station equipment according to claim 81, further comprising a geographical database registered in advance a combination of an area in which a determination target station to be radio-determined according to said singular or plurality P of determination station(s) or an area in which said determination target station cannot be located, and a navigation capable of eliminating an uncertainty of the location of said determination target station when one of said areas are used in determination done in said navigation, in correspondence to a combination of locations of said singular or plural P of determination station(s) and wherein said channel controlling means applies the area and an identifier of navigation registered in said geographical database corresponding to obtained locations and ingested results of determination of said singular or plural P of determination station(s).

83. The mobile station equipment according to claim 82, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

84. The mobile station equipment according to claim 83, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

85. The mobile station equipment according to claim 81, wherein: said channel controlling means associates with said radio base station through said radio interfacing means;

selects from other mobile stations located in the wireless zone in common with the local station, singular or plural P of mobile station(s) satisfying predetermined criteria according to procedure of said channel control; and performs channel control necessary for the selected mobile stations to operate as said determination stations.

86. The mobile station equipment according to claim 85, wherein said channel controlling means performs channel control necessary for the mobile station to operate as a determination station by associating with said radio base station through said radio interfacing means, when a mobile station operating instead of any one of said singular or plural P of mobile station(s) is selected by said radio base station.

87. A mobile station equipment comprising:

a radio interfacing means forming radio transmission paths between the radio interfacing means and a radio base station, and for sending and receiving transmission information through said radio transmission paths;

a channel controlling means associating with said radio base station through said radio interfacing means to perform channel control adapted for wireless zone; and a determination target station positioning means radio-determining location of a determination target station, which is a mobile station, and wherein said channel controlling means notifies to all or some of singular or plural P of determination station(s) to be the basis of said radio determination of said determination target station, a location which is radio-determined by said determination station positioning means, through said radio-interfacing means, in which said determination station(s) are mobile station(s), and perform desired determination of said determination target station.

88. The mobile station equipment according to claim 87, wherein said determination target station positioning means performs radio determination through radio channels assured desired transmission quality under channel control performed by said channel controlling means and discards a result contained in results of said radio determination, said result indicating transmission quality of applied radio channels below a predetermined lower limit.

89. A mobile station equipment comprising:

a radio interfacing means forming radio transmission paths between the radio interfacing means and a radio base station, and for sending and receiving transmission information through said radio transmission paths;

a channel controlling means associating with said radio base station through said radio interfacing means to perform channel control adapted for wireless zone, a determination station positioning means radio-determining locations of a singular or plural P of determination station(s) which is located in a wireless zone in common with a local station and which is to be a basis for radio determination of a determination target station, in which the determination station(s) and the determination target station are mobile stations, and wherein said channel controlling means notifies locations of all or some of said singular or plural P of determination station(s) individually radio-determined by said determination station positioning means, through said radio-interfacing means, to all or some of said determination stations and said determination target station in which said determination station(s) perform desired determination of said determination target station.

90. The mobile station equipment according to claim 89, wherein said determination station positioning means performs radio determination through radio channels assured desired transmission quality under channel control performed by said channel controlling means and discards a result contained in results of said radio determination, said result indicating transmission quality of applied radio channels below a predetermined lower limit.

91. A mobile station equipment comprising a radio interfacing means forming radio transmission paths between the radio interfacing means and a radio base station, and for sending and receiving transmission information through said radio transmission paths and a channel controlling means associating with said radio base station through said radio interfacing means to perform channel control adapted for wireless zone, wherein said channel controlling means performs, through said radio interfacing means, a relay of information which relates to a radio determination, in one or both of:

between a determination target station to be an object of radio determination and a singular or plural P of determination station(s) to be the basis of said radio determination, among mobile stations located in a wireless zone common with a local station and/or between said plural P of determination stations, in which the determination station(s) and the determination target station are mobile stations.

* * * * *